(12) United States Patent
Gotz et al.

(10) Patent No.: US 7,485,864 B2
(45) Date of Patent: Feb. 3, 2009

(54) RADIOMETER, SIGHTING DEVICE FOR A RADIOMETER AND METHOD THEREFOR

(75) Inventors: Meinrad Gotz, Bonndorf (DE); Patrick Zahn, Eisenbach (DE); Andreas Derr, Wutoschingen (DE); Herbert Rosenstiel, Eisenbach (DE); Uwe Haury, Lenzkirch (DE); Wolfgang Schworer, Loffingen (DE); Axel Richter, Dessau (DE); Martin Baecke, Dessau (DE)

(73) Assignee: Testo AG, Lenzkirch (DE)

( * ) Notice: Subject to any disclaimer, the term of this patent is extended or adjusted under 35 U.S.C. 154(b) by 657 days.

(21) Appl. No.: 10/714,692

(22) Filed: Nov. 17, 2003

(65) Prior Publication Data
US 2005/0029459 A1 Feb. 10, 2005

(30) Foreign Application Priority Data
Aug. 6, 2003 (DE) ............................... 103 36 097

(51) Int. Cl.
G01J 5/02 (2006.01)
G01C 15/00 (2006.01)
(52) U.S. Cl. ........................................ 250/353; 33/227
(58) Field of Classification Search ................. 250/330, 250/332, 336.1, 338.1, 338.3, 352, 353; 356/436, 356/456; 374/121, 130
See application file for complete search history.

(56) References Cited

U.S. PATENT DOCUMENTS 3,641,354 A * 2/1972 De Ment ..................... 250/216

3,775,620 A * 11/1973 Meier ........................ 250/353

(Continued)

FOREIGN PATENT DOCUMENTS

CA 2152024 12/1995

(Continued)

OTHER PUBLICATIONS

Miler, M., "Photoresist as a Recording Material for Holographic Elements," SPIE, vol. 2108, Dec. 1993, pp. 2-9.

(Continued)

Primary Examiner—David P Porta
Assistant Examiner—Faye Boosalis
(74) Attorney, Agent, or Firm—Heslin Rothenberg Farley & Mesiti P.C.

(57) ABSTRACT

The present invention relates to a radiometer comprising an IR detector, a lens and a light source. The lens is arranged with respect to the IR detector such that it focuses IR radiation from a measuring surface to the detector. The light source emits visible light for marking the measuring surface. The beam path of the visible light extends through the lens. Moreover, the invention relates to a sighting device for a radiometer for visibly marking a measuring surface the temperature of which is measured by the radiometer. The sighting device comprises a light source for emitting a visible light beam, which marks the measuring surface. A piezoactuator controls the direction of the light beam. As an alternative to the piezoactuator, the light beam may be guided at a constant angular velocity, and a stepwise change of the direction of the light beam may be accomplished by a sectorized mirror. The invention finally relates to corresponding methods. In addition, the invention relates to the adjustment of light sources in a sighting device.

70 Claims, 18 Drawing Sheets

U.S. PATENT DOCUMENTS

| | | | |
|---|---|---|---|
| 3,823,313 A | 7/1974 | Unema | 362/259 |
| 3,924,469 A * | 12/1975 | Brandli et al. | 374/129 |
| 4,123,147 A | 10/1978 | Hill et al. | 350/285 |
| 4,315,150 A | 2/1982 | Darringer et al. | 250/338.1 |
| 4,330,212 A | 5/1982 | Miller | 356/508 |
| 4,417,822 A * | 11/1983 | Stein et al. | 374/129 |
| 4,466,748 A * | 8/1984 | Needham | 374/129 |
| 4,494,881 A | 1/1985 | Everest | 374/124 |
| 4,499,897 A | 2/1985 | Roussel | 128/303.1 |
| 4,527,896 A | 7/1985 | Irani et al. | 356/43 |
| 4,576,432 A | 3/1986 | Ruger | 374/124 |
| 4,582,426 A | 4/1986 | Douglas | 356/43 |
| 4,591,256 A | 5/1986 | Matsumura | 396/115 |
| 4,626,686 A | 12/1986 | Pompei et al. | 250/342 |
| 4,963,096 A | 10/1990 | Khattak et al. | 434/21 |
| 5,085,525 A | 2/1992 | Bartosiak | 374/124 |
| 5,128,530 A * | 7/1992 | Ellerbroek et al. | 250/201.9 |
| 5,139,331 A * | 8/1992 | Gentile | 356/218 |
| 5,144,356 A | 9/1992 | Kurbitz et al. | 354/402 |
| 5,169,235 A | 12/1992 | Tominaga et al. | 374/129 |
| 5,172,978 A | 12/1992 | Nomura et al. | 374/130 |
| 5,229,889 A * | 7/1993 | Kittell | 359/849 |
| 5,258,871 A | 11/1993 | Gupta | 359/485 |
| 5,270,528 A * | 12/1993 | Ogikubo | 250/201.7 |
| 5,314,249 A * | 5/1994 | Marui et al. | 374/128 |
| 5,352,039 A * | 10/1994 | Barral et al. | 374/121 |
| 5,368,392 A | 11/1994 | Hollander et al. | 374/121 |
| 5,477,332 A * | 12/1995 | Stone et al. | 356/613 |
| 5,524,984 A | 6/1996 | Hollander et al. | 374/121 |
| 5,610,707 A * | 3/1997 | Duncan et al. | 356/121 |
| 5,626,424 A | 5/1997 | Litvin et al. | 374/121 |
| 5,653,537 A * | 8/1997 | Ignatowicz et al. | 374/131 |
| 5,727,880 A | 3/1998 | Hollander et al. | 374/121 |
| 5,739,533 A * | 4/1998 | Okubo et al. | 250/338.3 |
| 5,823,678 A * | 10/1998 | Hollander et al. | 374/121 |
| 5,823,679 A | 10/1998 | Hollander et al. | 374/121 |
| 5,836,694 A * | 11/1998 | Nguyen | 374/130 |
| 5,841,138 A | 11/1998 | Prekel | 250/341.1 |
| 6,123,453 A | 9/2000 | Hollander et al. | 374/121 |
| 6,183,129 B1 | 2/2001 | Aoyama et al. | 374/121 |
| 6,234,669 B1 | 5/2001 | Kienitz et al. | 374/130 |
| 6,267,500 B1 | 7/2001 | Hollander et al. | 374/121 |
| 6,280,082 B1 | 8/2001 | Aoyama et al. | 374/121 |
| 6,290,389 B2 | 9/2001 | Schmidt et al. | 374/121 |
| 6,341,891 B1 | 1/2002 | Hollander et al. | 374/121 |
| 6,359,678 B1 * | 3/2002 | Ota | 355/53 |
| 6,377,400 B1 | 4/2002 | Hollander | 359/618 |
| 6,515,285 B1 * | 2/2003 | Marshall et al. | 250/352 |
| 6,527,439 B1 | 3/2003 | Bellifemine | |
| 6,540,398 B2 * | 4/2003 | Hollander et al. | 374/121 |
| 6,565,815 B1 * | 5/2003 | Chang et al. | 422/198 |
| 6,585,409 B2 | 7/2003 | Schmidt et al. | 374/121 |
| 6,614,830 B1 | 9/2003 | Hollander | 372/109 |
| 6,633,434 B2 | 10/2003 | Hollander | 359/618 |
| 6,659,639 B2 | 12/2003 | Hollander et al. | 374/121 |
| 6,704,607 B2 * | 3/2004 | Stone et al. | 700/56 |
| 6,833,536 B2 * | 12/2004 | Shigeura | 219/553 |
| 6,853,452 B1 * | 2/2005 | Laufer | 356/436 |
| 6,888,853 B1 * | 5/2005 | Jurgensen | 372/6 |
| 6,901,089 B1 | 5/2005 | Hollander | 372/24 |
| 2002/0015434 A1 * | 2/2002 | Hollander et al. | 374/121 |
| 2002/0054729 A1 | 5/2002 | Berg et al. | 385/18 |
| 2002/0064341 A1 * | 5/2002 | Fauver et al. | 385/25 |
| 2002/0104318 A1 * | 8/2002 | Jaafar et al. | 62/3.6 |
| 2003/0128735 A1 | 7/2003 | Hollander et al. | 374/121 |
| 2003/0185273 A1 | 10/2003 | Hollander et al. | 374/121 |
| 2003/0210732 A1 | 11/2003 | Hollander et al. | 374/120 |
| 2004/0047393 A1 | 3/2004 | Hollander et al. | 374/121 |
| 2004/0079870 A1 * | 4/2004 | Salmon | 250/234 |
| 2004/0252731 A1 | 12/2004 | Hollander et al. | 372/9 |
| 2005/0013341 A1 | 1/2005 | Baghai | 374/120 |
| 2005/0089078 A1 | 4/2005 | Hollander et al. | 374/121 |
| 2005/0185694 A1 | 8/2005 | Hollander | 374/121 |
| 2005/0185695 A1 | 8/2005 | Hollander et al. | 374/121 |
| 2005/0201444 A1 | 9/2005 | Hollander et al. | 374/121 |
| 2006/0114966 A1 | 6/2006 | Kientz | |

FOREIGN PATENT DOCUMENTS

| | | | |
|---|---|---|---|
| DE | 32 13955 A1 | 10/1982 | |
| DE | 3607679 | 11/1986 | |
| DE | 3803464 | 8/1989 | |
| DE | 196 16 863 A1 | 10/1996 | |
| DE | 19528590 | 2/1997 | |
| DE | 195 48 036 A1 | 6/1997 | |
| DE | 196 54276 A1 | 6/1998 | |
| DE | 9422197 | 10/1998 | |
| DE | 199 49 198 A1 | 5/2001 | |
| DE | 100 36 720 A1 | 2/2002 | |
| EP | 0 458 200 A2 | 5/1991 | |
| EP | 0 867 699 A2 | 9/1998 | |
| GB | 2203537 | 10/1988 | |
| GB | 2 290 622 A | 1/1996 | |
| JP | 55-36327 | 8/1978 | |
| JP | 62-12848 | 2/1982 | 374/121 |
| JP | 57-22521 | 5/1982 | |
| JP | 60-51654 | 11/1985 | |
| JP | 63145928 | 6/1988 | |

OTHER PUBLICATIONS

Azzam, R.M.A., and Forgala, G.W., "Creation of an Optical XYZ Coordinate System Using Bidirectional Blazing From a Symmetric Triangular-Groove Grating in a Conical Diffraction Mount," Optics Letters, vol. 18, No. 24, Dec. 15, 1993, pp. 2162-2164.

"Laser Sighting for Precise Noncontact Temperature Measurement," RAYTEK, Santa Cruz, California, Nov. 8, 1993 (2 pages).

Haidner, H., et al., "Polarizing Reflection Grating Beamsplitter for the 10.6-μm Wavelength," Optical Engineering, vol. 32, No. 8, Aug. 1993, pp. 1860-1865.

Shuying, W., and Chun, L., "New Method of Designing High-Efficiency Multi-Beam Light-Splitter," SPIE, vol. 1973, Nov. 1993, pp. 87-93.

Hong, B., et al., "Laser Grating Interferometer Using Grating as Beam Splitter," Zhongguo Jiguang/Chinese Journal of Lasers, China, vol. A20, No. 1, 1993, pp. 34-37.

Pallister, D.M., et al., "Raman Microprobe with Holographic Beamsplitter for Low-Frequency Operation," Applied Spectroscopy, vol. 46, No. 10, 1992, pp. 1469-1473.

Schmidt, J., et al., "Diffractive Beam Splitter for Laser Doppler Velocimetry," Optical Letters, vol. 17, No. 17, Sep. 1, 1992, pp. 1240-1242.

Spornik, N.M., and Tuev, A.F., "Universal Interferometer with the Reference Wave Formed From the Object Wave," Optiko-Mekhanicheskaya Promyshlennost, Russia, Sov. J. Opt. Technol., vol. 59, No. 9, Sep. 1992, pp. 552-554.

Kawatsuki, N., and Uetsuki, M., "Crossed Grating Beam Splitter for Magnetooptical Pickup Head," Japanese Journal of Applied Physics Part 1—Regular Papers Short Notes & Review Papers, Japan, vol. 29, No. 11, Nov. 1990, pp. 2420-2423.

Lu, X., et al., "The Fabrication of a 25×25 Multiple Beam Splitter," Optics Communications, vol. 72, Nos. 3, 4, Jul. 15, 1989, pp. 157-162.

McCormick, F.B., "Generation of Large Spot Arrays from a Single Laser Beam by Multiple Imaging with Binary Phase Gratings," Optical Engineering, Apr. 1989, vol. 28, No. 4, pp. 299-304.

Kim, R.C., and Case, S.K., "Holographic Beamsplitter for Multiple Plane Wave Formation with Matched Phasefronts," SPIE, vol. 1052, "Holographic Optics: Optically and Computer Generated," 1989, pp. 52-64.

Mokry, P.A., "Unique Applications of Computer-Generated Diffractive Optical Elements," SPIE, vol. 1052, "Holographic Optics: Optically and Computer Generated," 1989, pp. 163-171.

Lehureau, J.C., et al., "Polarizing Grating Beamsplitter Using a Liquid Crystal Cell," Japanese Journal of Applied Physics, Supplement, Japan, vol. 28, Supp. No. 28-3, 1989, pp. 201-203.

Gaylord, T.K., and Moharam, M.G., "Analysis and Applications of Optical Diffraction by Gratings," Proceedings of the IEEE, vol. 73, No. 5, May 1985, pp. 894-937.

Molesini, G., et al., "Laser Unequal Path Interferometer Configurations by Grating Splitting at the Fourier Plane," Optical Engineering, vol. 23, No. 5, Sep./Oct. 1984, pp. 646-649.

Mikes, T., "Fringe Benefits: Applications of Holographic Elements," Photronics Spectra, Mar. 1983, pp. 40, 42, 44.

Harvey, J.E., and Scott, M.L., "Hole Grating Beam Sampler-Versatile High-Energy Laser (HEL) Diagnostic Tool," Optical Engineering, Nov./Dec. 1981, vol. 20, No. 6, pp. 881-886.

Courjon, D., and Bulabois, J., "Noncoherent Microholography Using a Holographic Optical Element as a Beamsplitter," Optical Engineering, vol. 20, No. 2, Mar.-Apr. 1981, pp. 233-235.

Hansen, J.P., and Strong, J., "Performance of a Simple Spherical Lamellar Grating Beamsplitter by Wavefront Division," Aspen International Conference on Fourier Spectroscopy, Air Force Cambridge Res. Labs., Bedford, MA, 1971, pp. 215-220.

Munnerlyn, C.R., "A Simple Laser Interferometer," Applied Optics, vol. 8, No. 4, Apr. 1969, pp. 827-829.

* cited by examiner

RADIOMETER, SIGHTING DEVICE FOR A RADIOMETER AND METHOD THEREFOR

CROSS REFERENCE TO RELATED CO-PENDING APPLICATIONS

This application claims the priority of the corresponding German National Application Serial No. 103 36 097.2 filed on Aug. 6, 2003 and entitled RADIOMETER, VISIEREINRICHTUNG FUER EIN RADIOMETER SOWIE VERFAHREN which is commonly assigned and the contents of which is expressly incorporated herein by reference.

FIELD OF THE INVENTION

The invention relates to a radiometer for the contactless temperature measurement of objects. The radiometer is moreover provided with a sighting device for visualizing the measuring surface of the infrared sensor on the object. In addition, the invention relates to corresponding sighting devices. The invention moreover relates to methods for producing a visible marking of the measuring surface of an infrared sensor on the object. The invention finally relates to the adjustment of light sources in the sighting device.

BACKGROUND OF THE INVENTION

Radiometers serve to detect the temperature of an object in a contactless manner by the detection of the infrared (IR) radiation emitted by the object by means of an IR detector. The area of the object, the radiation of which is detected by the detector, is called radiation measuring surface or only measuring surface of the temperature measuring device. In order to measure the temperature reliably, it is important to know the location and the size of the measuring surface. The location and the size of the measuring surface depend on the alignment of the measuring device, the construction of the detector, the properties of an IR optics and the measuring distance. Different kinds of construction of sighting devices for the visualization of measuring surfaces are known, which produce a visible marking inside and/or at the edge of the measuring surface.

The marking can, for example, comprise several light points which are produced at the edge of the measuring surface by means of one laser or several lasers and adapted projection lenses. According to DE 196 54 276 A1 the light points are produced with laser beams extending to each other in a skew manner, each of which are directed into the desired direction by means of a deviating prism.

It is known from EP 0 867 699 A2 and U.S. Pat. No. 5,368,392 to mark the measuring surface by a continuous bordering line. The bordering line may be produced by a rotating laser. According to another embodiment, a laser beam is deflected by a rotating mirror such that it produces a circular bordering line on the object. If the laser beam is moved at a frequency of more than 30 Hz it seems to draw a continuous bordering. Another embodiment of said documents uses a beam splitting device for splitting one laser beam into a plurality and for marking the periphery of the measuring surface with several points. An optical fiber bundle may be used as beam splitting device. Alternatively, also several individual lasers may be employed.

Documents EP 0 458 200 A2 and U.S. Pat. No. 5,172,978 disclose a radiometer whereof the sighting means is coaxially arranged about a combination of a detector and a condensing lens. With said condensing lens the detector is projected on the object in a focused manner. The measuring surface merely has the size of the sensor surface of the detector. The sighting device is formed by at least one concentric Fresnel lens, with which an additional light source is projected onto the object, likewise in a focused manner. The IR beam path is separated from the beam path of the visible light. According to an embodiment described in said documents two concentric Fresnel lenses may be employed. According to another embodiment described in said documents an annular mirror may be employed together with an annular lens for projecting the visible light.

A similar radiometer is known from DE 100 36 720 A1. The annular lens known from EP 0 458 200 A2 is called a toroidal lens. Since said document discloses that marking light hits the rear side of the toroidal lens, here, too, the IR beam path is separated from the beam path of the visible light. According to an embodiment the IR optics finitely projects the detector along an optical axis so that the measured beam path is a hyperboloid with one shell. The corresponding marking beam path is formed in that light from the light source is deviated into straight paths at the toroidal lens, with the paths extending to each other in a skew fashion and to the optical axis on a hyperboloid surface which encloses the measured beam path. The marking beam path therefore shows a narrowest contraction. For producing the marking beam path, the toroidal lens has a non-rotationally symmetrical lens body, the rear side of which is a conical surface and the front side of which is a piece-wise, continuous screw-shaped annular surface. Disclosed are annular surfaces with one, two, ten and thirty-six sections.

It is desirable to provide an improved radiometer, sighting device and corresponding methods.

SUMMARY OF THE INVENTION

According to an embodiment of the invention a sighting device for a radiometer for visibly marking a measuring surface is provided. The radiometer measures the temperature of the measuring surface. The sighting device comprises a light source emitting a visible light beam marking the measuring surface and a piezoactuator for controlling the direction of the light beam.

According to another embodiment a sighting device for a radiometer is provided. The sighting device visibly marks a measuring surface, the temperature of which is measured by the radiometer. The sighting device comprises a light source for emitting a visible light beam marking the measuring surface and an actuator for controlling the direction of the light beam. The actuator comprises a coil and a magnet. The magnet is located in the interior of the coil so that, in response to the current flow, the coil presses the magnet out of the coil or pulls it into the coil.

According to a further embodiment a sighting device for a radiometer for visibly marking a measuring surface is provided. The sighting device comprises least three light sources and a control circuit. Each of the three light sources emits a visible light beam; and said light sources being arranged such that said light beams generate bright points at an edge of said measuring surface. The control circuit switches the light sources on and off. The control circuit is connected to each of said light sources and constructed such that at most two light sources are switched on simultaneously.

According to yet another embodiment a sighting device for a radiometer for visibly marking a measuring surface is provided. The temperature of the measuring surface is measured by the radiometer. The sighting device comprises light source which a light source for emits a visible light beam marking the measuring surface. The light source guides the light beam at a constant angular velocity and the sighting device comprising a sectorized mirror upon which the light beam falls. The sectorized mirror causes a stepwise change of a direction of the light beam.

According to yet a further embodiment a sighting device for a radiometer for visibly marking a measuring surface is provided. The temperature of the measuring surface is measured by the radiometer. The sighting device comprises a light source, an individual receptacle and a fixation. The light source mounted in a housing. The receptacle has a hollow space which is larger than the outer dimensions of a housing of the light source and receives the housing of the light source. The fixation fixes the housing of the light source in the hollow space and is formed such that an optical axis of the light source extends parallel to a mechanical axis of the individual receptacle.

According to yet another embodiment a sighting device for a radiometer for visibly marking a measuring surface is provided. The temperature of the measuring surface is measured by the radiometer. The sighting device comprises a plurality of light sources and a plurality of individual receptacles. One individual receptacle is provided for each light source. An optical axis of each light source is aligned parallel to a mechanical axis of the corresponding individual receptacle.

According to yet a further embodiment a radiometer is provided. The radiometer comprises an IR detector, a lens and a light source. The lens is arranged with respect to the IR detector such that it focuses IR radiation from a measuring surface to the detector. The light source emits visible light for marking the measuring surface. The beam path of the visible light extends through the lens.

According to yet another embodiment a radiometer is provided which comprises an IR detector, a lens and a light source. The light source emits visible light for marking a measuring surface. The lens being arranged with respect to the IR detector such that it focuses IR radiation from a measuring surface to the detector. The lens is inclined versus the optical axis so that the reflected portion of the IR radiation encountering the outer side of the lens is smaller than a reflected portion of the light of the light source encountering the outer side of the lens.

According to yet a further embodiment a method for a radiometer of visibly marking a measuring surface is provided. The method comprises emitting a visible light beam by a light source for marking the measuring surface. A direction of the light beam is controlled by means of a piezoactuator.

According to yet another embodiment a method for a radiometer of visibly marking a measuring surface is provided which comprises emitting a visible light beam by a light source for marking the measuring surface. The direction of the light beam is controlled by means of an actuator, wherein the actuator comprises a coil. A magnet is located in an interior of the coil so that, in response to a current flow through the coil, the coil presses the magnet out of the coil or pulls it into the coil.

According to yet a further embodiment a method for a radiometer of visibly marking a measuring surface, comprises emitting visible light beams by at least three light sources for marking the measuring surface. Each light source emits one light beam. The light sources are switched on and off. At most two light sources are switched on simultaneously.

According to yet another embodiment a method for a radiometer of visibly marking a measuring surface is provided. The method comprises emitting a visible light beam by a light source for marking the measuring surface. The light beam is guided at a constant angular velocity. The direction of the light beam is changed stepwise by a sectorized mirror.

According to yet a further embodiment a method for a radiometer for adjusting a light source for visibly marking a measuring surface is provided. A housing of a light source is introduced into an individual receptacle. An optical axis of the light source is aligned parallel to a mechanical axis of the individual receptacle. The housing of the light source is fixed within the individual receptacle.

According to yet another embodiment a method for a radiometer for adjusting a light source for visibly marking a measuring surface is provided. Each light source of a plurality of light sources is introduced into an individual receptacle. An optical axis of each the light sources is aligned parallel to a mechanical axis of the corresponding individual receptacle. The light sources together with the receptacles are assembled into a sighting device.

According to yet a further embodiment a method for a radiometer is provided. IR radiation emitted by a measuring surface is focused by means of a lens on an IR detector. A temperature of the measuring surface is determined on the basis of a signal supplied by the IR detector. The measuring surface is marked by visible light. The visible light is guided through the lens.

According to yet another embodiment a method for a radiometer is provided. IR radiation emitted by a measuring surface is focused by means of a lens on an IR detector. The lens is inclined versus an optical axis. A temperature of the measuring surface is determined on the basis of a signal supplied by the IR detector. Visible light is emitted onto an outer surface of the lens so that a reflected portion of the IR radiation encountering an outer side of the lens is smaller than the reflected portion of the visible light of the light source encountering the outer side of the lens. Visible light reflected by the outer surface of the lens marks the measuring surface.

The advantage of the fact that the beam paths of both the visible light for marking the measuring surface and the IR radiation extend through one and the same lens resides in that a misalignment between the beam paths is kept small. Thus, a great accordance between the marking and the actual measuring surface is achieved independently of the distance between the radiometer and the measuring surface.

By using a deviating means, the distance between the IR detector and the light source can be selected sufficiently large, so that a good thermal insulation between the IR detector and the light source may be achieved. A poor thermal insulation between the IR detector and the light source reduces at least the measuring accuracy, and may even result in incorrect measurements.

For saving additional lenses, the deviating means may advantageously comprise a lens function, so that light beams hitting the deviating means at different locations are deflected about different angles.

The advantage of a prism resides in the small absorption thereof.

If the deviating means is formed by a mirror, the thickness of the reflecting metal layer may be selected such that the IR radiation nearly totally passes the mirror and visible light is nearly totally reflected.

The advantage of a bore in the center of the lens resides in that the IR-transparent lens material does not weaken the visible light serving marking purposes, whereas a misalignment between the beam paths of the IR radiation and the visible light is avoided.

Alternatively, the deviating means may comprise a central hole, through which the IR radiation falls on the IR detector in an unweakened fashion. The visible light serving marking purposes, on the other hand, falls through the edge of the IR lens, so that it only has to pass a short distance in the IR-transparent lens material and is, therefore, weakened only slightly.

One or more lenses in the beam path of the visible light may expand the beam path of the visible light. Thus, the angular region, about which the visible light beam originally has to be deflected, can advantageously be reduced.

By inclining the lens, the same may advantageously at the same time serve as a mirror. For improving the reflection of visible light, the side of the lens facing the measuring surface may be provided with a thin metal layer.

The advantage of controlling the direction of the light beam by a piezoactuator resides in that piezoactuators, especially piezo-bending actuators, are inexpensive and robust and only require little electric power during operation.

Semiconductor lasers constitute an intensive light source, the light of which can be parallelized with little effort and high accuracy.

The attachment of the light source at one end of the piezoactuator advantageously avoids additional mechanical components like axles and bearings.

The rotation of the light source about an axis, which advantageously extends through the center of gravity of the light source, results in a smaller mechanical inertia than does an attachment of the light source on the piezoactuator. In this way, the direction of the visible light beam may be changed faster.

An even larger reduction of the mechanical inertia is provided by a system according to which the piezoactuator carries a mirror or is metallized itself. In contrast to the piezoactuator, a thin metal layer serving as a mirror has a mass to be neglected.

In all embodiments, in which all piezoactuators are firmly clamped on one side, no connecting lines have to be moved, as the connecting lines may be connected with the firmly clamped side of the piezoactuator.

A marking of the measuring surface by points has a smaller surface to be illuminated than a circular marking. If the luminous power is limited, the points may therefore be illuminated brighter.

By the running light type illumination of points, additional information on the change of the measured value can be shown. The direction may thereby constitute the sign of the change and the speed the absolute value of the change.

Flashing points may advantageously constitute an alarm. The alarm may be released once the measured value exceeds or is below a threshold value.

BRIEF DESCRIPTION OF THE DRAWINGS

The invention will hereinafter be explained in more detail by means of preferred embodiments with reference to the attached drawings. Identical parts are thereby designated by the same reference numbers, wherein.

DETAILED DESCRIPTION OF THE INVENTION

Figure 1:
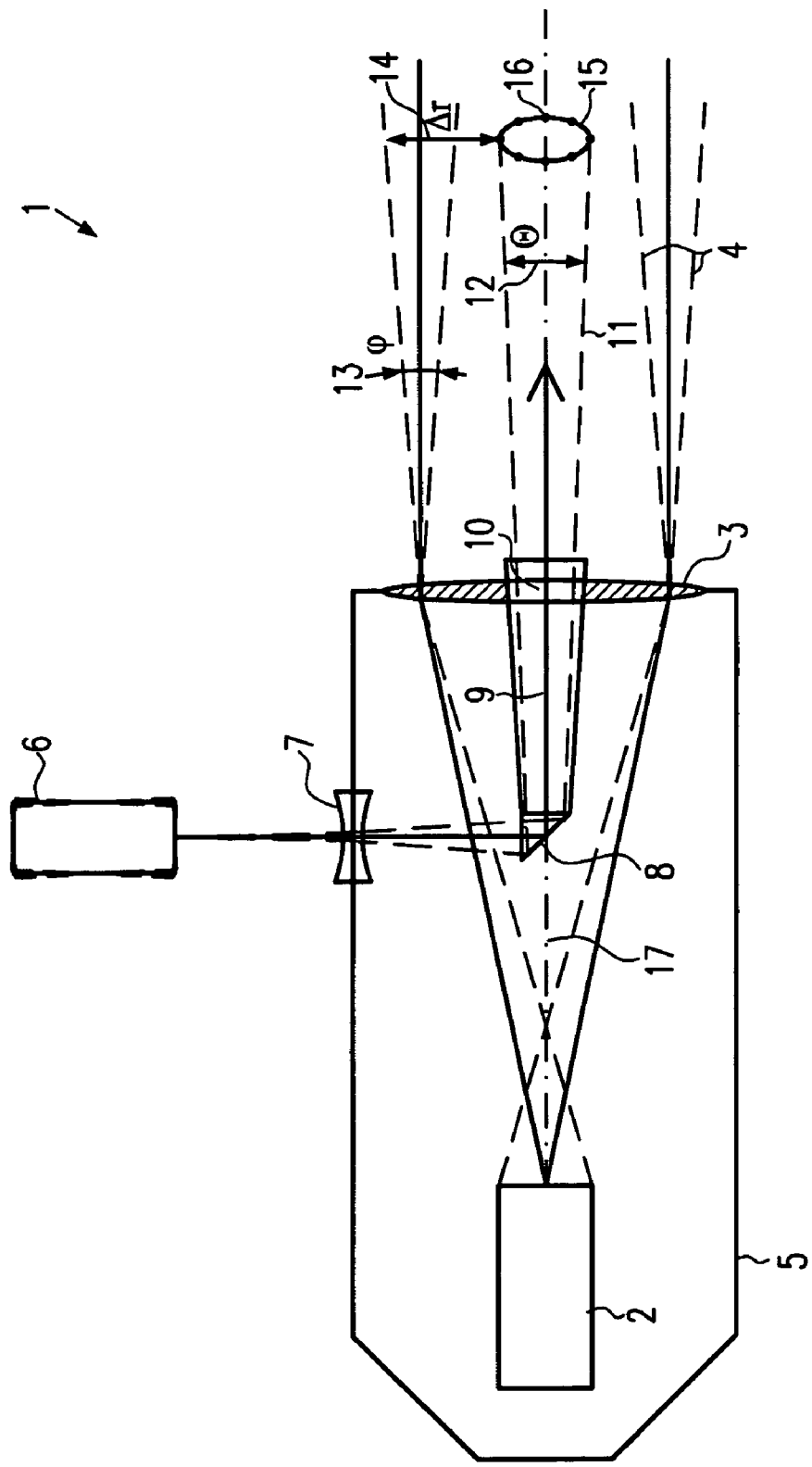
FIG. 1 shows a radiometer, wherein a visible laser beam is deviated by a prism and falls through an IR lens on the object to be measured.

FIG. 1 shows a first embodiment of a radiometer 1 with a laser sighting device. The radiometer 1 comprises a pyrosensor 2, an IR lens 3, a housing 5, a laser module 6, a lens 7, a prism 8 as well as a holding device 9.

The pyrosensor 2 serves as IR detector. In the embodiment illustrated in FIG. 1 the distance between the pyrosensor 2 and IR lens 3 is just as large as the focus of the IR lens 3, so that the IR lens 3 infinitely projects the pyrosensor 2. The aperture angle φ (reference number 13) of the IR beam path 4 results as quotient of the diameter of the pyrosensor 2 divided by the focus of the IR lens 3. If, for example, the IR lens 3 constitutes a 40:1 optics, it means that the aperture angle φ 0.025 in radian measure is correspondingly 1.4°. With a 5 meter distance, this results in a measuring surface having a diameter of 12.5 cm.

For being able to correctly mark the measuring surface, the aperture angle Θ (reference number 12) of the sighting beam path 11 should correspond to the aperture angle φ of the infrared beam path 4. It should be noted that the measuring surface is not sharply limited. Provided that the distance between the measuring surface and the IR lens 3 is large over the diameter of the IR lens 3, the measuring surface has a transitional area at its edge, whereof the width corresponds, in a radial direction, approximately to the diameter of the IR lens 3, largely independently of the distance from the IR lens 3. IR radiation from the inside of the measuring surface, the outer edge of which is formed by the inner edge of the transitional area, is weighted largely identically during the temperature measurement, regardless of the location of its emissions. Within the transitional area the weighting of IR radiation becomes the smaller, the larger the distance of the location of its emissions from the optical axis 17 is. At the outer edge of the transitional area the weighting reaches nearly 0. The deviation from 0 outside the transitional area can, among others, be explained by scattered light.

If both aperture angles φ and Θ of the IR beam path 4 or, respectively, the sighting beam path 11 are equally large, the marking 15 marks the center of the transitional area pretty exactly. The deviation from the center can, among others, be explained by that the visible light beams do not start out from the central point of the IR lens 3, but from the laser module 6.

Due to the dispersion of the material of the IR lens 3 the laser module 6 and the pyrosensor 2 could be arranged at different locations on the optical axis 17. Zinc selenite (ZnSe), a popular IR lens material, has a slightly larger refractive index for visible light than for IR radiation. Therefore, laser module 6 would have to be arranged between pyrosensor 2 and IR lens 3, so that laser module 6 most likely screens off a major part of the IR radiation and heats the pyrosensor 2 due to the spatial proximity to the same. For this reason, a deviating means is used according to the embodiments described in connection with FIGS. 1 to 5, so as to couple visible light into the IR beam path.

According to the embodiment illustrated in FIG. 1 said deviating means is formed by a prism 8. Prism 8 is fastened to the IR lens 3 by a holding device 9. The IR lens 3 may comprise a hole 10 so as to stop the absorption of visible light in the lens material. The holding device 9 may be fastened in hole 10 by means of a driving fit. Prism 8 and holding device 9 may be made of an injection molded part. According to another embodiment the prism 8 may be attached on the IR lens 3, for instance, by means of gluing. The absorption in the IR lens material according to this embodiment may be compensated by a higher luminous power of laser module 6.

Instead of the aforementioned 1:40 optics, a 1:9 optics may likewise be used, which results in an aperture angle φ of about 6.4°. It is difficult to produce such angles with piezo-bending actuators. For this reason, a concave lens 7 may be provided, which expands the aperture angle of the visible light beams emitted from laser module 6. Such an expansion may be accomplished, in another embodiment, by means of the prism 8. For this purpose, the prism 8 has a concave total reflection surface. In FIG. 1 the total reflection surface intersects the optical axis 17 approximately underneath an angle of 45°.

Different embodiments of laser module 6 will be described in connection with FIGS. 6 to 15.

Figure 2:
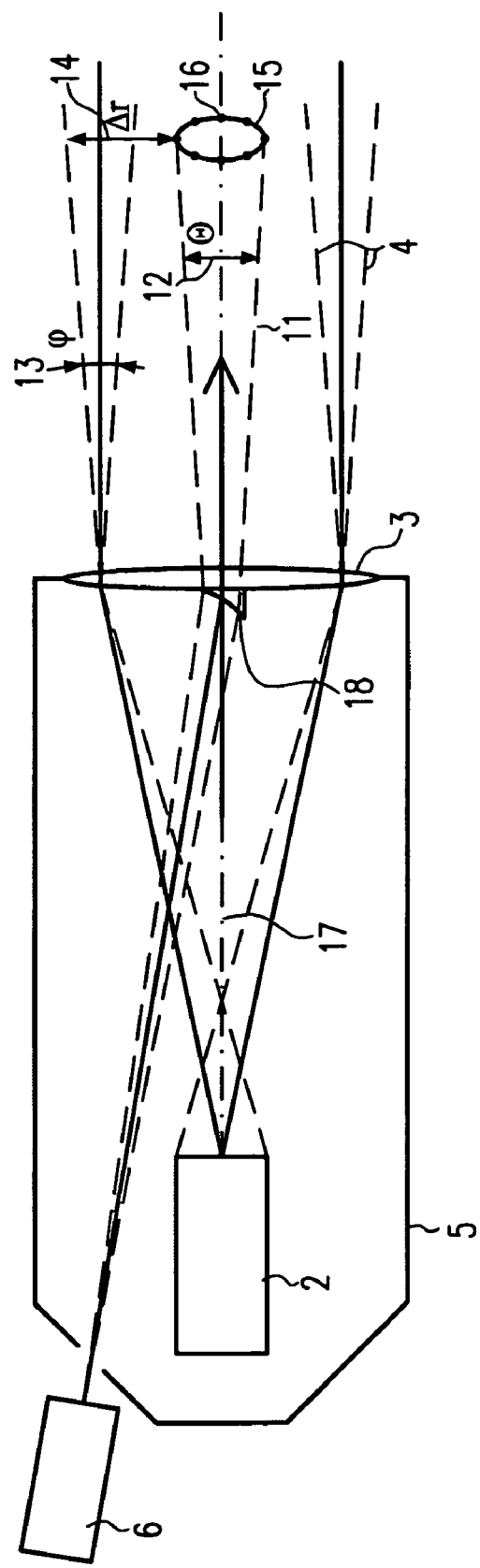
FIG. 2 shows a similar radiometer as the one in FIG. 1, wherein the prism expands the beam paths of the laser beam.

FIG. 2 shows a similar radiometer as the one illustrated in FIG. 1. Other than in FIG. 1, the visible light serving to mark 15 the measuring surface is not coupled into the IR beam path 11 underneath an angle of 90°. The laser module 6 is rather located next to the pyrosensor 2, so that the laser light is coupled in from the back. In contrast to prism 8, no total reflection of the visible light takes place in the wedge-shaped prism 18. The visible light is rather refracted. According to the embodiment shown in FIG. 2 the prism 18 has a concave surface for expanding the sighting beam path. According to another embodiment, however, a prism with plane peripheries may also be employed. The advantage of the embodiment shown in FIG. 2 resides in the compact construction, with which a sufficient thermal decoupling between the pyrosensor 2 and the laser module 6 is nevertheless obtained.

Figure 3:
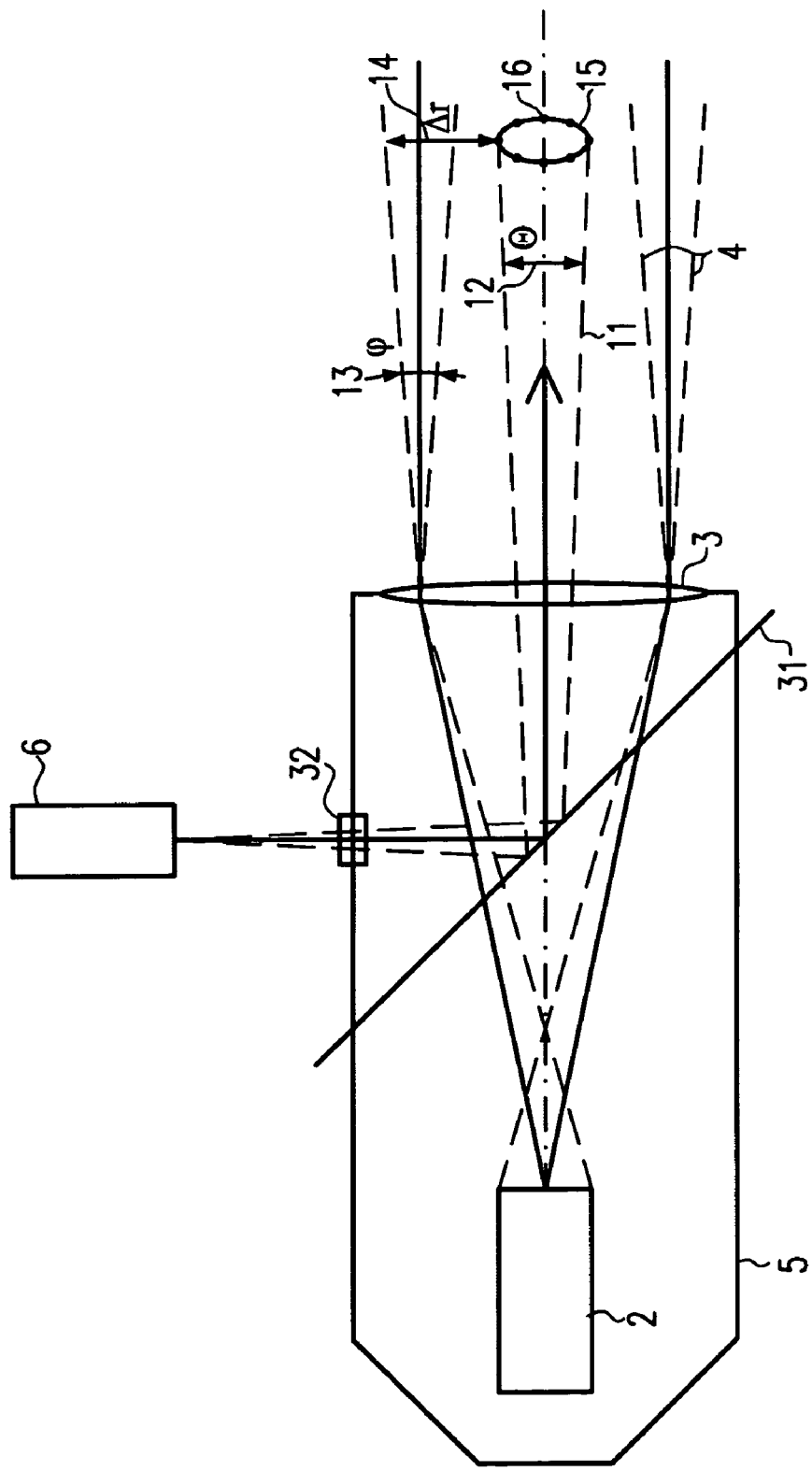
FIG. 3. shows a similar radiometer as the one in FIG. 1, wherein the visible laser beam is deviated by an IR-transparent mirror.

FIG. 3 shows a similar radiometer as the one illustrated in FIG. 1. In contrast to the radiometer illustrated in FIG. 1, the visible laser beam in FIG. 3 is deviated by an IR-transparent mirror. According to an embodiment, the reflecting layer is formed by a thin metal layer. Red light having a wavelength of 670 nm or 630 nm is commonly used as visible light. The IR radiation to be measured has wavelength in the range of 8 to 13 μm. Due to the skin effect, the longer wave IR radiation penetrates deeper into a thick metal layer. The thickness of a thin metal layer can, therefore, be selected such that visible light nearly completely reflects, while IR radiation, on the other hand, passes nearly unweakened.

Moreover, lens 7 in FIG. 3 is replaced by glass 32, so that no expansion of the aperture angle 12 of the sighting beam path 11 by glass 32 takes place. If an expansion of the aperture angle 12 is necessary, glass 32 may be replaced by lens 7, or a curved IR-transparent mirror 32 may be used. The glass 32 may also be made of a transparent plastics material.

Figure 4:
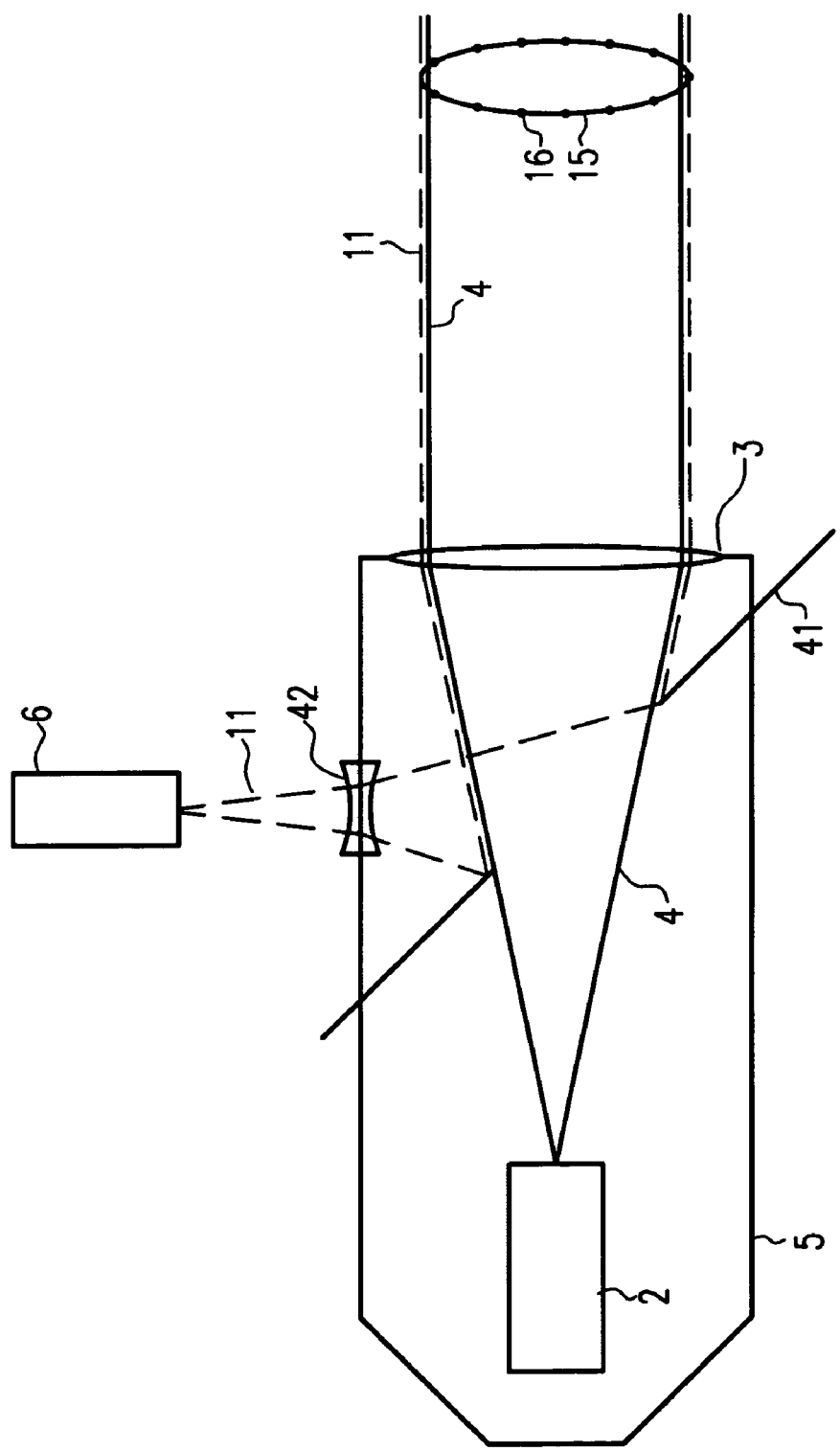
FIG. 4. shows a similar radiometer as the one in FIG. 3, wherein the mirror comprises a central hole.

FIG. 4 shows a similar radiometer as the one illustrated in FIG. 3, wherein the mirror 41 has a central hole. The IR radiation falls through said central hole onto the pyrosensor 2. For this reason, the mirror 41 need not necessarily be IR-transparent. An IR-transparency is advantageous, however, since more IR radiation falls onto the pyrosensor 2, so that a more exact temperature measurement is possible. The visible light passes the IR lens 3 in its thin marginal area and is, for this reason, weakened to a smaller extent compared to when it would pass the IR lens 3 in the middle.

According to the embodiment illustrated in FIG. 4 the pyrosensor 2 may be farther away from the IR lens 3 than is the focus of the IR lens 3. In this case, the pyrosensor 2 is finitely projected along the optical axis 17, so that the measured beam path is a single shell hyperboloid (cf. DE 100 36 720 A1, FIGS. 4 and 6). For being able to correctly mark the measuring surface according to this embodiment, independently of its distance from the IR lens 3, mirror 41 may form a piece-wise, continuous screw-shaped surface. The mirror may, for instance, have eight continuous sections and, thus, also eight points of discontinuity. By this it is possible to produce a sighting beam path having a waist S (cf. DE 100 36 720 A1, FIGS. 4, 6). In another embodiment a plane mirror 41 and a facet lens known from DE 100 36 720 A1 may be employed for producing a sighting beam path having waist S. Here, the facet lens covers the marginal area of the IR lens 3.

Figure 5:
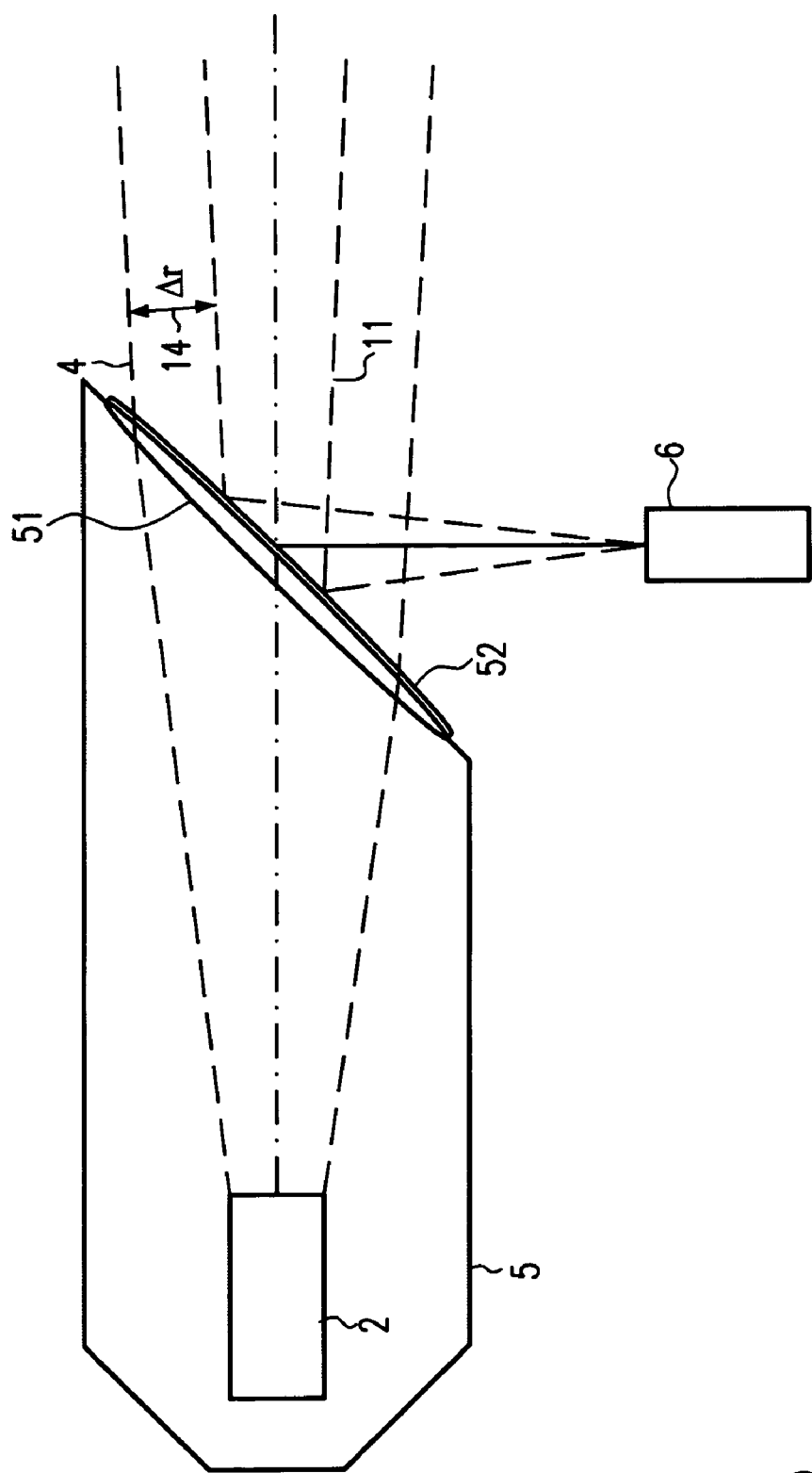
FIG. 5 shows a similar radiometer as the one in FIG. 3, wherein a coating of a lens forms the IR-transparent mirror.

According to the embodiment illustrated in FIG. 5 the front side of the IR lens 51 forms a mirror surface. The IR lens 51 may be vapor-plated with a thin metal layer 52 on its front side, i.e. the side facing the measuring surface. As was explained above, the thickness of the metal layer may be selected such that visible light nearly completely reflects, whereas the IR radiation is nearly completely transmitted. The radius of curvature of the front side defines as to how strongly the sighting beam path 11 is expanded by the reflection on the front side. No expansion takes place if the front side is flat, i.e. if the radius of curvature is infinite. The radius of curvature of the rear side, i.e. the side facing the pyrosensor 2, may be selected such that the desired focus of the IR lens 51 for IR radiation is obtained.

FIGS. 6 to 15 show embodiments of the laser module 6.

Figure 6:
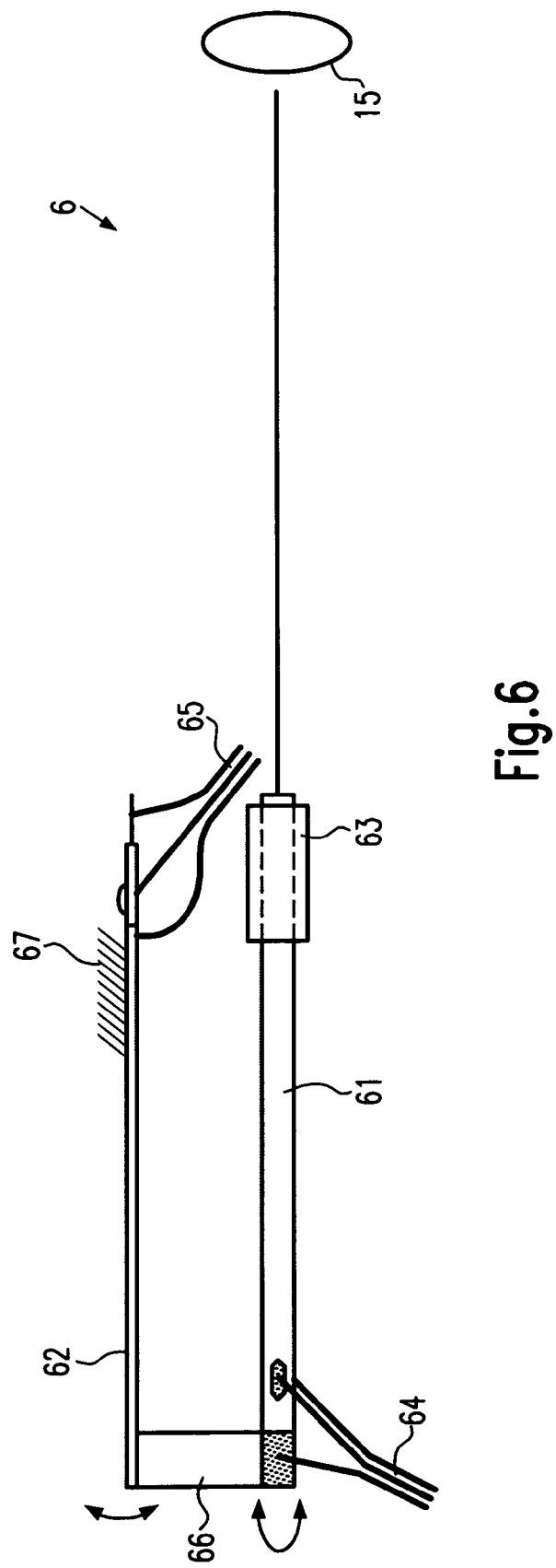
FIG. 6 shows an assembly of two piezo-bending actuators for controlling the direction of a laser beam.

FIG. 6 illustrates an embodiment of a laser module 6, according to which two piezo-bending actuators 61, 62 carry a laser 63. Piezo-bending actuators 61 and 62 may have a length of approximately 30 mm and a rectangular cross-section of 1×3 mm. Piezo-bending actuators constitute an embodiment of piezoactuators. The piezo-bending actuators bend about their narrow side as is illustrated by means of arrows in FIG. 6. Piezo-bending actuator 61 is firmly connected to piezo-bending actuator 62 by a connector 66. The piezo-bending actuator 62 is firmly clamped on one end by means of attachment 67. Both piezo-bending actuators 61 and 62 are inclined against each other by 90°, so that piezo-bending actuator 61 deflects laser 63 horizontally (in X-direction) and piezo-bending actuator 62 deflects laser 63 vertically (in Y-direction). Piezo-bending actuators 61 and 62 are supplied with voltage, which may range between 0 and several 100 V, by means of connecting lines 64 or 65, respectively.

Figure 8:
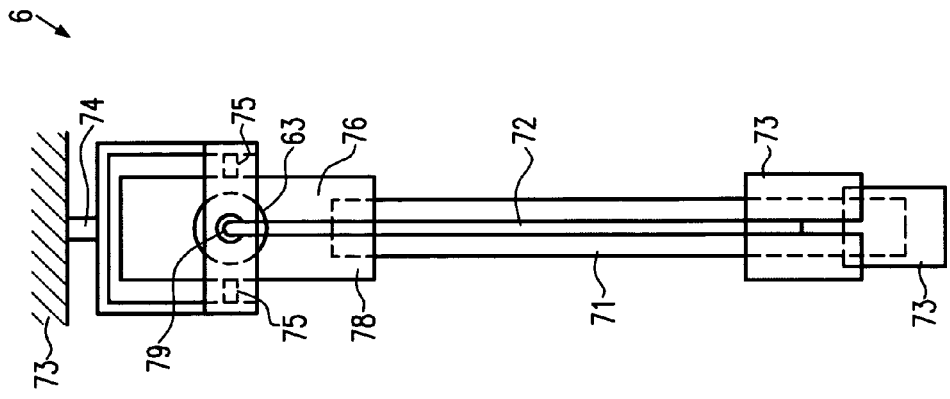
FIG. 8 shows a cardanic suspension of a laser illustrated in FIG. 7 from the back.
Figure 7:
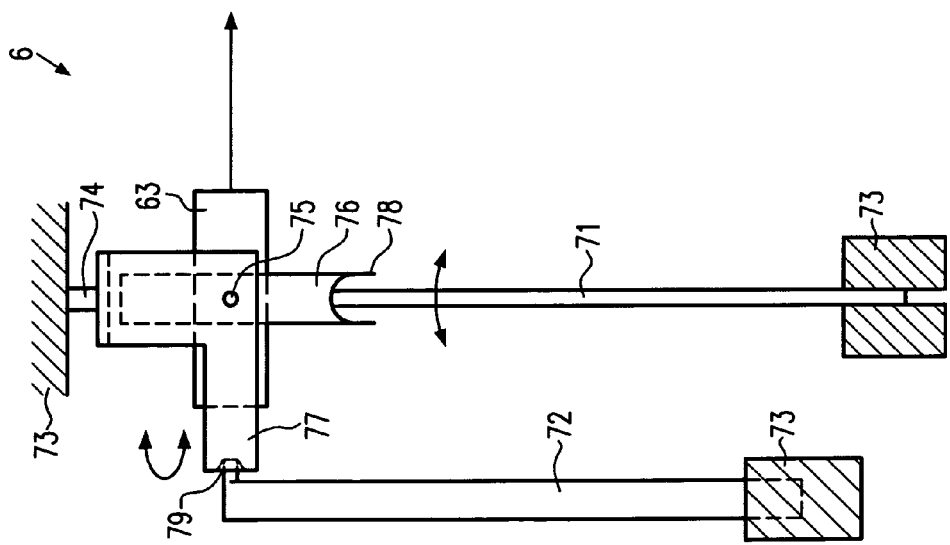
FIG. 7 shows a cardanic suspension of a laser from the top.

FIGS. 7 to 10 show an embodiment of laser module 6, according to which laser 63 is cardanically suspended. An advantage of a cardanic suspension of the laser resides in the small mechanical inertia which allows, with the same force, a faster reaction. Laser 63 can be rotated about two axes which may extend through its center of gravity. FIG. 7 shows a top view. FIG. 8 shows the cardanic suspension from the back.

Figure 10:
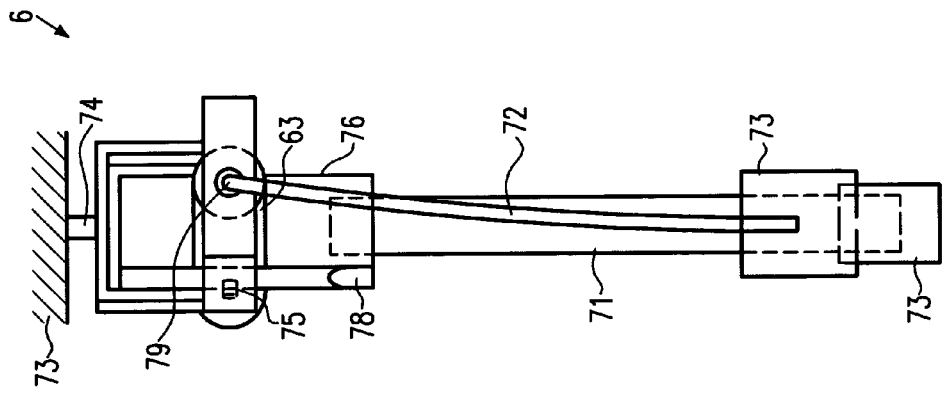
FIG. 10 shows a cardanic suspension of a laser illustrated in FIG. 9 with a deflected X-piezo-bending actuator from the back.
Figure 9:
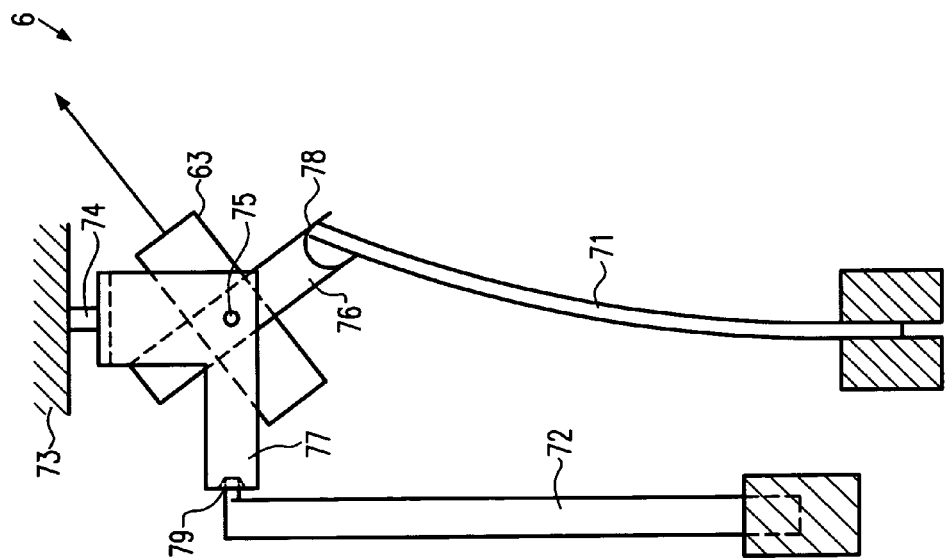
FIG. 9 shows a cardanic suspension of a laser from the top with a deflected X-piezo-bending actuator.

The cardanic suspension comprises bearings 73, axes 74 and 75, arms 76 and 77 as well as guide mechanisms 78 and 79. Piezo-bending actuators 71 and 72 each engage with one end the guide mechanisms 78 or 79, respectively, and are clamped into bearings 73 at their other end. Piezo-bending actuators 71 and 72 provide for a horizontal or, respectively, vertical deflection, as is illustrated in FIGS. 9 and 10. Another advantage of the cardanic suspension resides in that, due to the shorter length of arms 76 and 77 versus piezo-bending actuators 71 and 72, the angularly small deflections of piezo-bending actuators of a few degrees can be multiplied.

FIG. 9 shows a cardanic suspension of a laser from the top with a deflected X-piezo-bending actuator, and FIG. 10 shows a cardanic suspension illustrated in FIG. 9 with a deflected Y-piezo-bending actuator from the back.

According to another embodiment, arm 77 may be replaced by a piezo-bending actuator. In this embodiment, the piezo-bending actuator 72 may be omitted.

Figure 11:
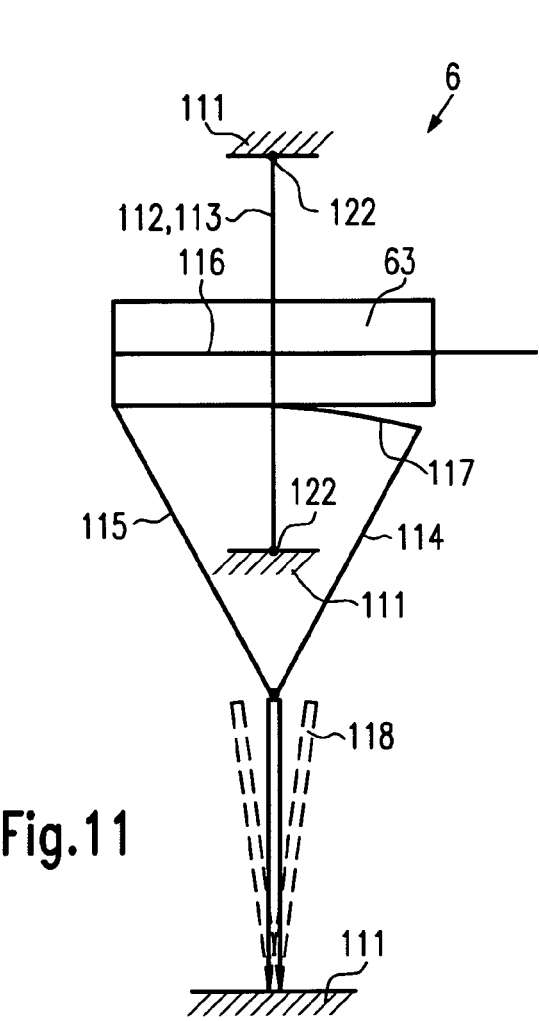
FIG. 11 shows a lateral view of a laser suspended on wires.
Figure 12:
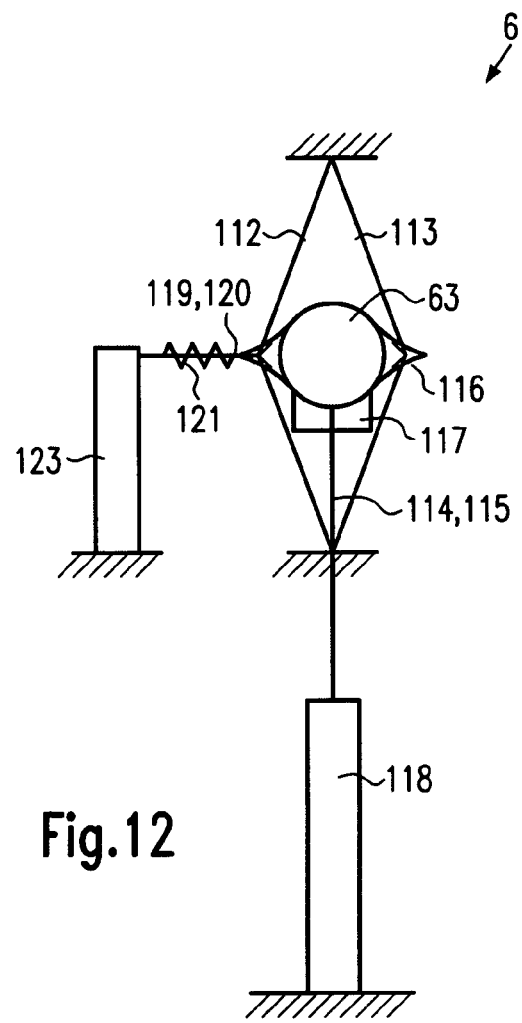
FIG. 12 shows the suspension of a laser illustrated in FIG. 11 from the back.
Figure 13:
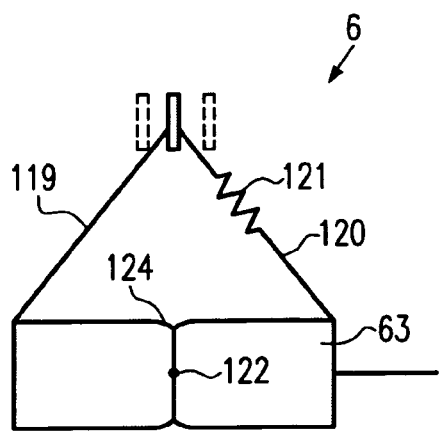
FIG. 13 shows the suspension of a laser illustrated in FIG. 11 from the top.

FIGS. 11 and 13 show another embodiment of a cardanic suspension. According to said embodiment, arms 76 and 77 are replaced by wires 112 and 113 so as to further reduce the mechanical inertia. Wires 112 and 113 are fastened in bearings 111. Laser 63 comprises edges 116 with notches 124 through which the wires 112 and 113 extend.

Notches 124 define a horizontal axis about which laser 63 is deflected in a vertical direction by piezo-bending actuator 118. Bearings 111 define a horizontal axis about which laser 63 is deflected in a horizontal direction by piezo-bending actuator 123. The horizontal and the vertical axis are to extend through the center of gravity of laser 63 so as to keep the mechanical inertia as small as possible. Wires 114 and 115 transmit the deflection of piezo-bending actuator 118 to laser 63. In order to prevent a looseness, leaf spring 117 tightens the wires 114 and 115. The deflection from piezo-bending actuator 123 is transmitted to laser 63 by the wires 119 and 120 in a similar fashion. For this purpose, a helical spring 121 is provided so as to avoid any looseness. A helical spring may also be employed instead of a leaf spring 117. Also, a leaf spring may be employed instead of a helical spring 121.

Figures 14, 15:
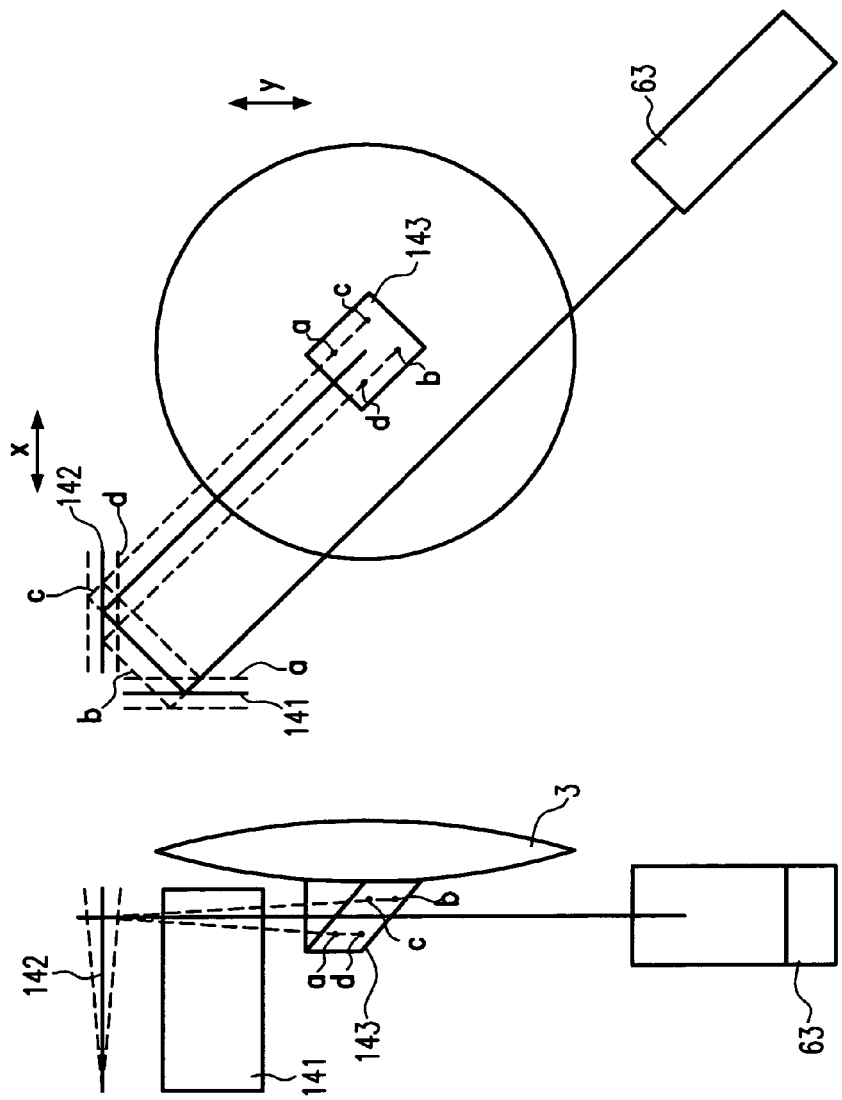
FIG. 14 shows a lateral view of an embodiment for the deflection of a laser beam by metallized piezo-bending actuators.
FIG. 15 shows the embodiment illustrated in FIG. 14 from the back.

FIGS. 14 and 15 show an embodiment for the deflection of a laser beam by metallized piezo-bending actuators. Laser 63 emits visible light falling, at first, onto metallized piezo-bending actuator 141. The same reflects the visible light further to metallized piezo-bending actuator 142, which deviates the visible light to prism 143. Similarly to the embodiment described in FIG. 1, the prism 143 deflects the visible light by approximately 90°. The visible light finally falls through the IR lens 3 onto the measuring surface and marks the same. Piezo-bending actuators 141 and 142 enclose an angle of 90°.

Piezo-bending actuator 141 provides for a deflection in the X-direction. Piezo-bending actuator 142 provides for a deflection in the Y-direction. The beam paths for two deflected positions a and b of piezo-bending actuator 141 as well as two deflected positions c and d of piezo-bending actuator 142 are shown particularly in FIG. 15. For positions a and b it is assumed that piezo-bending actuator 142 is not deflected. This applies analogously to positions c and d and piezo-bending actuator 141. The beam paths are likewise designated by one of the letters a to d. Without a deflection of piezo-bending actuators 141 and 142, the laser beam defines a laser plane parallel to the lens plane of IR lens 3, before the laser beam is deflected from the laser plane by means of prism 143. By the deflection of one of said two piezo-bending actuators 141 or 142 the laser beam is likewise deflected from the laser plane, as is illustrated in FIG. 14.

According to a modification of this embodiment, piezo-bending actuator 142 may be replaced by a segmented mirror. This mirror is formed such that the shape of its outer portion corresponds to the metallized piezo-bending actuator 142 in a rest position. Thus, the beam paths a and b remain unchanged. The inner portion may, for instance, comprise two segments, whereby the one segment is parallel to the mirror surface of piezo-bending actuator 142 in position c, while the other segment is parallel to the mirror surface of piezo-bending actuator 142 in position d. Thus, beam paths similar to the beam paths c and d are formed. According to another modification also several, such as six segments may be provided, wherefrom eight sighting beams result. Since piezo-bending actuator 141 approximately executes a sinusoidal oscillation, the inner segments may be chosen larger than the outer segments. Thus, it is obtained that each sighting beam gets an identically large share of the laser light, so that the marking points appear to be equally bright.

Figure 16:
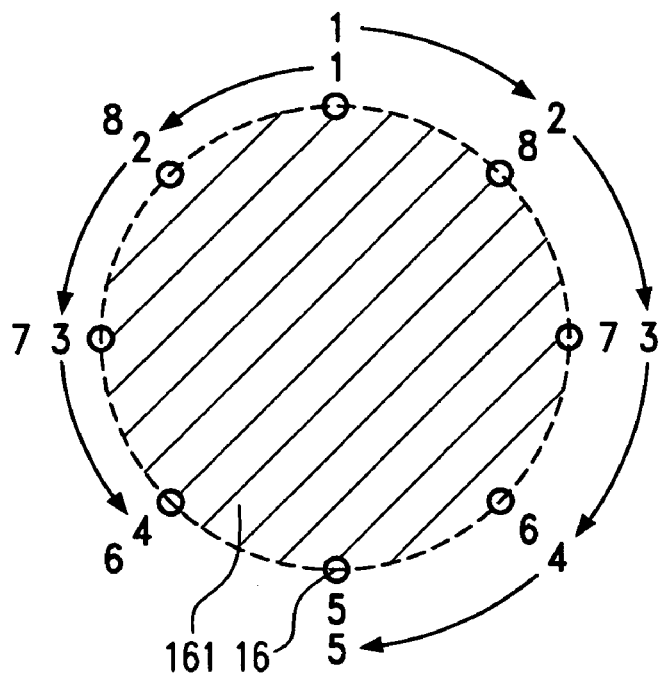
FIG. 16 shows circulating markings about the measuring surface.

FIG. 16 shows an example of the marking of the measuring surface 161 by points 16. If the periphery of the measuring surface 161 is marked merely with a small number of points 16, the surface to be illuminated is smaller as if the entire periphery were to be illuminated. If the luminous power is the same, points therefore appear brighter than the peripheral line. In FIG. 16 the number of points is 8.

If the peripheral line or the individual points are illuminated at a frequency of more than 25 to 30 Hz, a viewer will no longer perceive the flickering. For providing the viewer with additional information, the peripheral line may be traveled along clockwise or anti-clockwise at a frequency of less than 20 Hz. The viewer now notices that one marker runs around the measuring surface. The rotational frequency can correspond to the absolute value of the change of the measured temperature. The sense of rotation can display the sign of the change of the measured temperature. For instance, a temperature increase can be depicted by a clockwise rotation, and a temperature drop can be depicted by an anticlockwise rotation.

By stepwise relaying the deflection of laser 63, the viewer may gain the impression that merely a limited number of points, e.g. eight, is illuminated. If the relaying between the individual points takes place at a frequency of less than (20 Hz*number of points), it will be perceived by the viewer. As was explained above, the sense of rotation may display the sign, and the frequency the absolute value of the change of the changed temperature.

Figure 17:
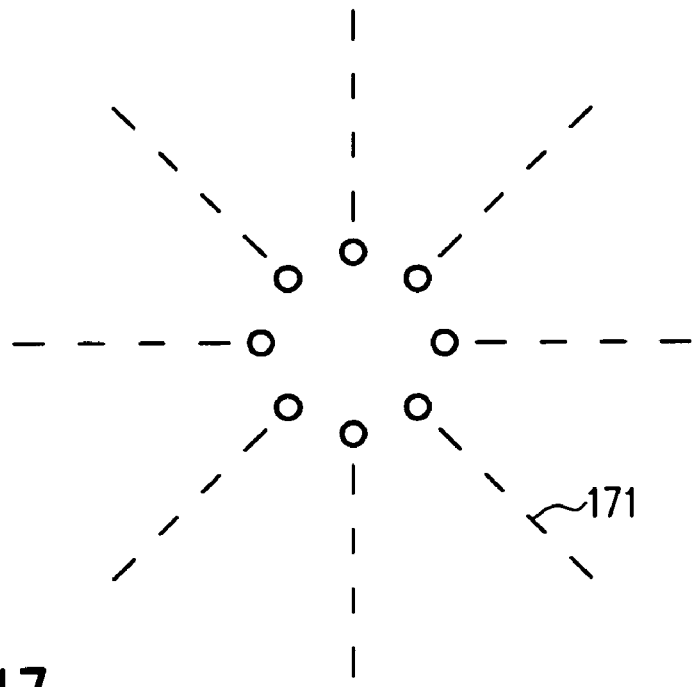
FIG. 17 shows a flashing of the marking.

Moreover, it is feasible to let the points 16 or the peripheral line flash. For this purpose, the points 16, or the peripheral line, are illuminated at a frequency of more than 30 Hz. In addition, laser 63 is switched on and off at a frequency of below 20 Hz, which the viewer perceives as flashing or flickering in response to the frequency. In FIG. 17, the flashing or flickering 171 is illustrated by dashed lines. Said operation mode may be employed for representing an alarm. The alarm may, for example, be released when the measured temperature exceeds a threshold value or is below the same. Said operation mode may, however, also be used for displaying the end of a temperature measurement, or for displaying when the absolute value of the time derivative of the measured temperature is below a predefined threshold value.

According to another embodiment laser module 6 moves laser 63 and, thus, the laser beam at a constant angular velocity $2\pi f$ of more than $2\pi(30\ Hz)$. Laser 63 is switched on for a short time period t at a frequency of n*f, with time t being short over 1/(n*f). During time t, laser 63 is operated at an increased power so that the medium power of laser 63 is as high as that of the other embodiments, according to which laser 63 is operated in a continuous wave mode. According to this embodiment, too, the measuring surface is marked by bright short dashes or points.

Figures 18, 19:
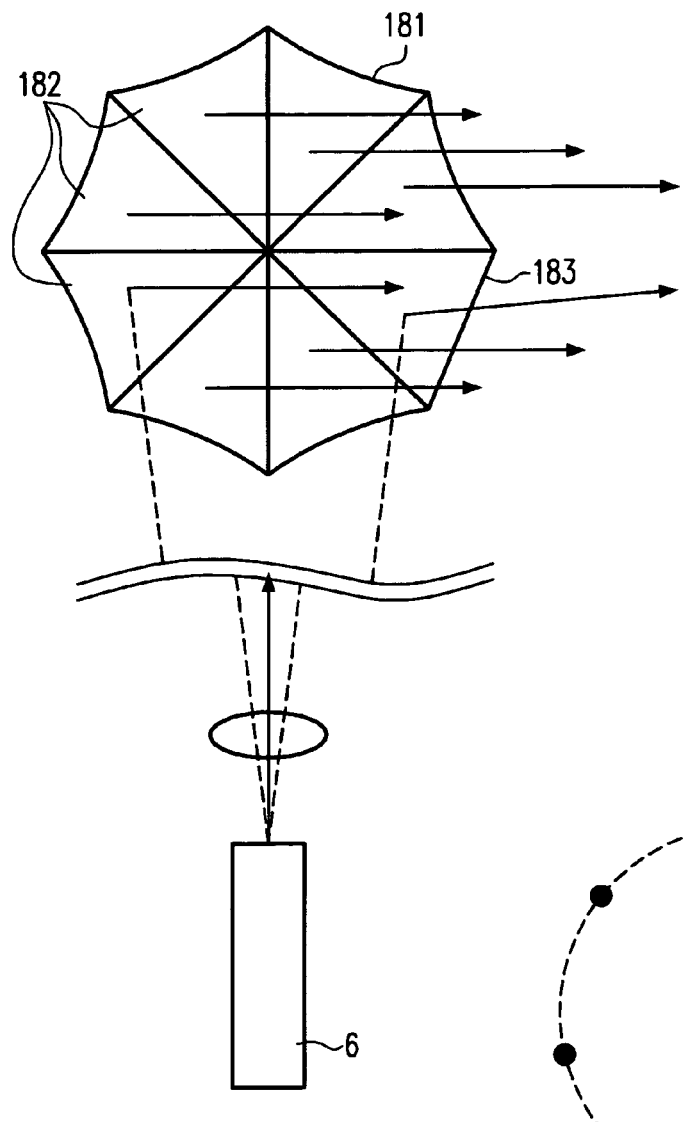
FIG. 18 shows a sectorized deflection mirror.
FIG. 19 shows a produced point image.

FIG. 18 shows a sectorized mirror 181 having seven concave sectors 182 and one inwardly inclined concave sector 183. The sectorized mirror 181 may replace the IR-transparent mirror 31 in FIG. 3 or mirror 41 in FIG. 4. Moreover, prisms 8 or 143 may be replaced by the sectorized mirror 181. Said embodiment is similar to the one shown in FIG. 3, however, the sectorized mirror according to this embodiment only covers the central portion about the optical axis of the IR radiation. Finally, the form of the total reflection surface of prism 8 may correspond to the form of sectorized mirror 181. Similarly, the concave surface of prism 18 may correspond to the form of the sectorized mirror 181. The sectorized mirror 181 may, for instance, be fabricated by means of injection molding.

The purpose of the sectorized mirror 181 resides in that the stepwise relaying of the deflection of laser 63 is accomplished by the sectorized mirror 181, while the laser module 5 guides laser 63 at a constant angular velocity. Each individual concave sector 182 of the sectorized mirror 181 projects the laser beam onto one point 16, whereas the inwardly inclined concave sector 183 projects the laser beam onto the central point 191. In general, it is impossible that the laser beam—regardless of the distance between the measuring surface and the IR lens 3—be projected by each sector 182 and 183 exactly onto one point. Nevertheless, the brightness of the point-wise marking clearly increases over an illumination of the entire peripheral line of the measuring surface, even if short dashes are illuminated instead of points.

According to another embodiment the sectorized mirror 181 may comprise merely concave sectors 182. The central point 191 is then missing in the point image.

Figure 20:
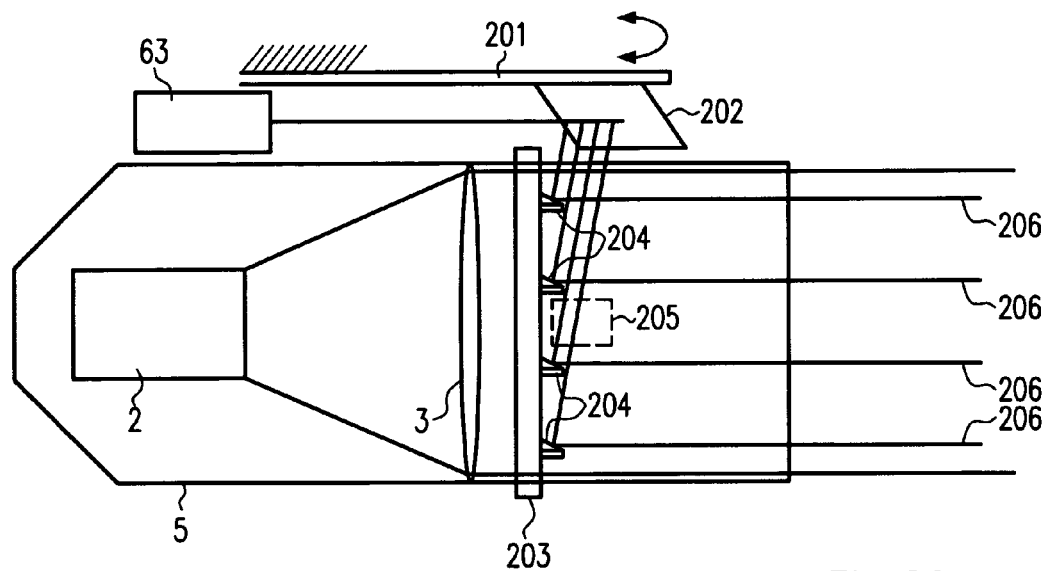
FIG. 20 shows a lateral view of a sighting device with a piezoactuator.
Figure 21:
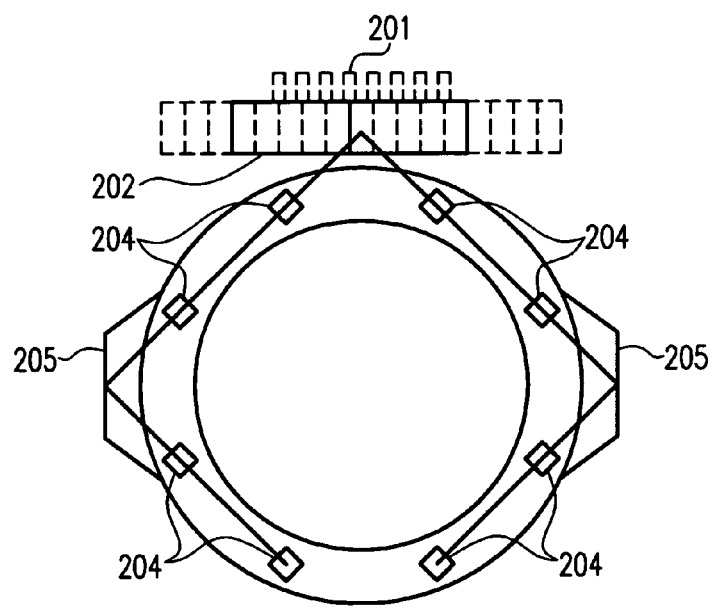
FIG. 21 shows a rear view of the sighting device with a piezoactuator.

FIGS. 20 and 21 show an embodiment, according to which only one piezo-bending actuator is necessary. Said embodiment comprises a laser 63, piezo-bending actuator 201, a plough mirror 202, a segmented mirror ring 203 with mirror segments 204 and lateral mirrors 205. Said components produce sighting beams 206. As was explained above in connection with other embodiments, the pyrosensor 2, the IR lens 3 and the housing 5 serve the contactless temperature measurement. The mirror ring 203 with mirror segments 204 and lateral mirror 205 may be an injection molded part. Also the plough mirror 202 may be an injection molded part.

The segmented mirror ring can be arranged in a plane perpendicularly to the optical axis. In its rest position, the piezo-bending actuator 201 is arranged parallel to the optical axis. The piezo-bending actuator 201 moves the plough mirror 202 backwards and forwards. In FIG. 21, a position of the plough mirror 202 is illustrated with continuous lines, and seven other positions are illustrated in dotted lines. In response to the position of the plough mirror 202, the laser beam is deviated to one of a total of eight mirror segments 204. Said beam paths are shown in both FIG. 20 and FIG. 21.

Each mirror segment 204 deviates the laser beam again to one of eight sighting beams 206. In order to prevent the beam paths particularly to the lower four mirror segments from extending through the IR beam path, which would accordingly require bores in the housing 5, lateral mirrors 205 are provided. As can be seen especially in FIG. 20, the beam paths to the lower mirror segments extend parallel to the beam paths to the upper mirror segments in the upper half.

Since the piezo-bending actuator 201 in this embodiment, too, approximately executes a sinusoidal oscillation, the mirror segments in the middle may be larger than the upper and the lower mirror segments, for illuminating all markers equally bright.

It is obvious to persons skilled in the art that by the orientation of the individual mirror surfaces of mirror segments 204, parallel, diverging or skew sighting beams 206 can be produced. If the IR lens 3 finitely projects the pyrodetector 2, especially skew sighting beams are suited to mark the measured hyperboloid (cf. DE 100 36 720 A1).

In modifications of this embodiment the plough mirror 202 may be formed of more than two segments. Thus, the laser beam may be deviated directly, i.e. not via the lateral mirror 205, to the lower mirror segments 204. Moreover, the individual mirror segments of the plough mirror 202 and the mirror segments 204 may be concave or convex so as to minimize a movement of the sighting beams in a preferred measuring distance. The mirror segments may also be formed in a convex fashion such that the convex form compensates the movement of the plough mirror 202 caused by the piezo-bending actuator 201. This, too, minimizes the movement of the sighting beams.

Figure 22:
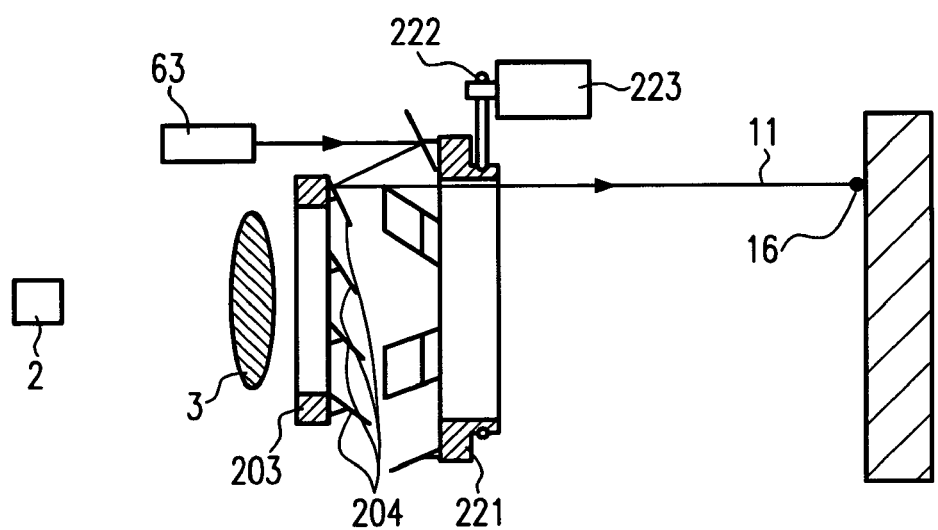
FIG. 22 shows a lateral view of a sighting device with a mirror wheel.

FIG. 22 shows an embodiment similar to that of FIG. 21. However, the plough mirror 202 has been replaced by a mirror wheel 221. The mirror wheel 221 is driven via a driving belt 222 by motor 223. Both the mirror ring 203 and the mirror wheel 221 comprise a central opening through which the infrared radiation falls from the measuring surface through lens 3 onto the pyrosensor 2. The central opening of mirror wheel 221 is slightly larger than that of the mirror ring 203, allowing also the sighting beams 11 to reach the measuring surface through said opening.

The mirror wheel 221 and the mirror ring 203 comprise the same number of mirror segments. Each mirror segment on the mirror wheel 221 has an angle different from the beam of laser 63, when the beam hits the mirror segment. By this, each segment of the mirror wheel 221 directs the laser beam to a corresponding mirror segment on the mirror ring 203 and, thus, to a corresponding measuring point 16. If each mirror segment forms a section from a surface area of a cone, the laser beam is deflected immediately, despite the movement of the mirror wheel 221, as long as it encounters a mirror segment of mirror wheel 221. This eliminates the movement of the markers 16. Each mirror segment on the mirror wheel 221 covers the same angular area on the mirror wheel 221 so as to ensure an equal brightness of the markers.

Figure 23:
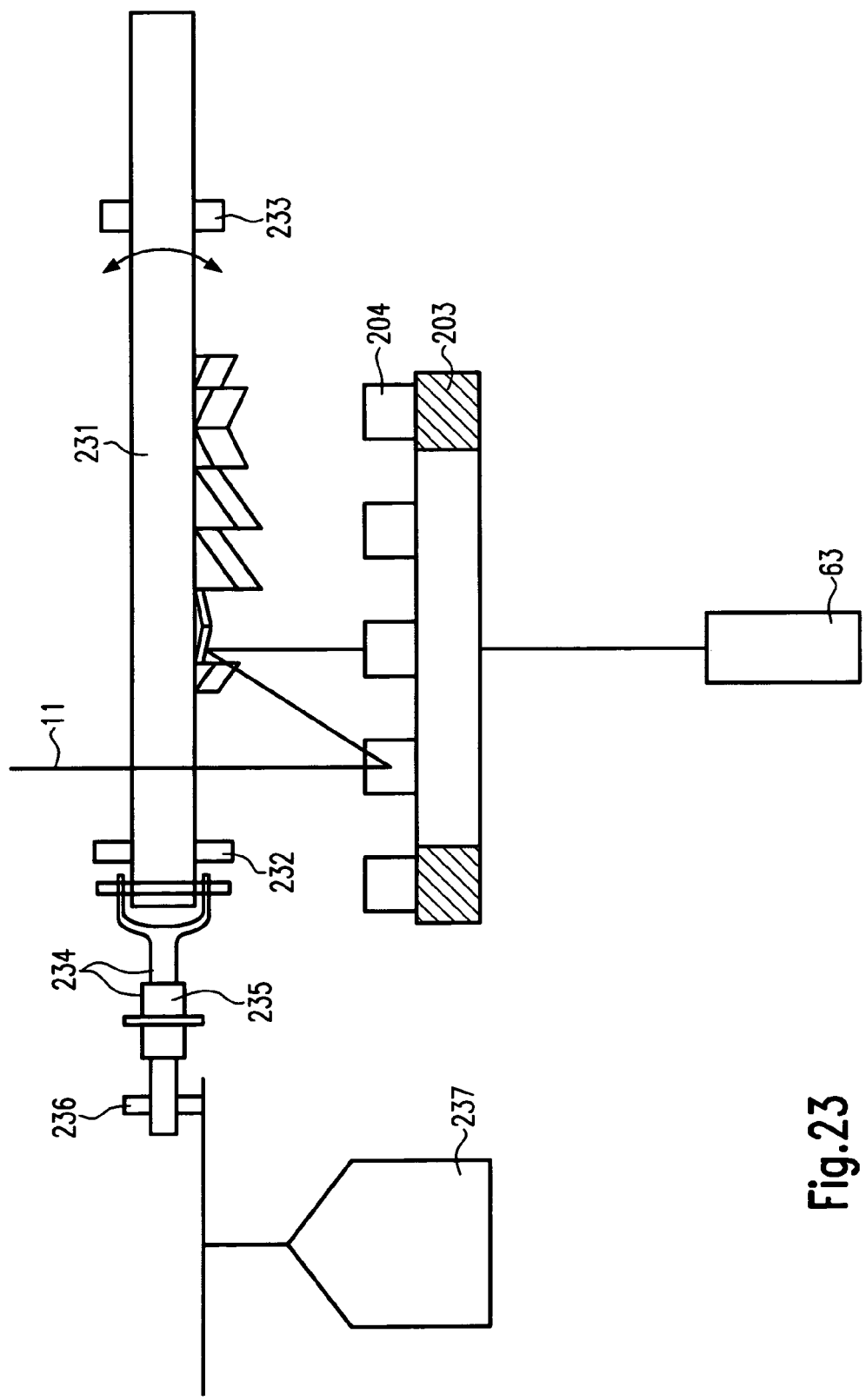
FIG. 23 shows a top view of a sighting device with a beam saw.
Figure 24:
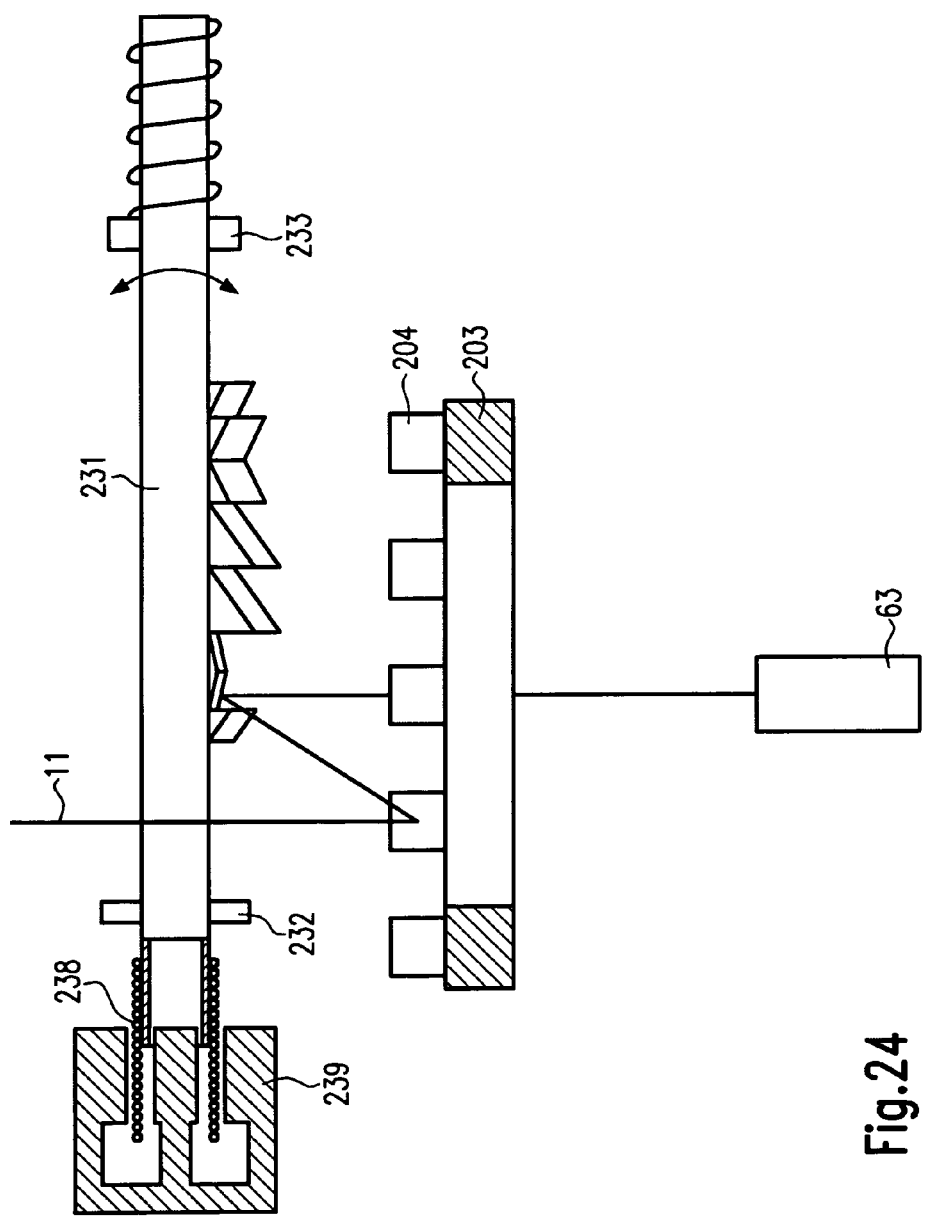
FIG. 24 shows a top view of another sighting device with a beam saw.

FIGS. 23 and 24 show similar embodiments, wherein the mirror wheel 221 has been replaced by a beam saw 231, however. Similar to the mirror wheel 221, the beam saw 231 likewise comprises mirror segments with a different alignment. Again, each mirror segment on the beam saw 231 is associated with a mirror segment on the mirror ring 203. The beam saw 231 is retained by bearing 232 and by adjustment bearing 233. The adjustment bearing 233 allows the rotation of the beam saw 231 about its longitudinal axis so as to align the mirror segments of the beam saw 231. According to further embodiments the bearing 232 and/or the adjustment bearing 233 may be movable for adjusting purposes upwards and downwards in the plane of projection and/or perpendicularly to the plane of projection. The adjustment may be accomplished by means of an adjusting screw for each degree of freedom. For avoiding looseness the bearings may be biased by springs against the adjusting screws. The beam saw 231 is driven by a motor 237 via an eccentric 236 and a connecting rod 234. The connecting rod 234 may comprise an adjusting screw 235 by means of which the length of the connecting rod 234 can be varied. The adjusting screw 235 may be provided with a left-handed thread for the right-handed connecting part, and a right-handed thread for the left-handed connecting part. After the adjustment, the adjusting screw 235 may be fixed by means of a screw lacquer.

Due to the drive by means of the eccentric 236 and the connecting rod 234 the beam saw 231 approximately executes a sinusoidal movement. For achieving an identical brightness of the markers, the inner mirror segments on the beam saw 231 are larger than the outer ones. The brightness of the individual markers may, however, also be modified and particularly adapted by means of amplitude and/or pulse width modulation. The embodiment shown in FIG. 24 differs from that of FIG. 23 merely by the drive of the beam saw 231. According to FIG. 24 the beam saw 231 is driven by a coil 238 which, in response to the current flow, more or less immerses into magnet 239. The spring 240 defines the rest position of the beam saw 231. The time progress of the velocity of the beam saw 231 may approximately be triangular or sinusoidal. In both cases, the inner segments must be larger than the outer ones so as to ensure an identical brightness of the markers with a temporally constant laser power.

In each of the embodiments shown in FIGS. 20, 21, 23 and 24 each mirror segment is scanned twice during a movement period of the plough mirror 202 or beam saw 231. By switching off the laser 63 during the forward and backward movement at movement frequencies of the plough mirror 202 or the beam saw 231 of below 20 Hz, the viewer perceives the rotation of the markers around the measuring surface clockwise or anticlockwise. Thus, the viewer can be displayed an increase or drop of the measured temperature. The frequency can visualize the absolute value of the time derivative of the measured temperature.

At movement frequencies above 25 to 30 Hz of the plough mirror 202, mirror wheel 221 or beam saw 231 the viewer perceives the markers as a standing pattern. By switching the laser 63 on and off, the brightness of individual markers may be varied. Moreover, by skillfully switching the laser 63 on and off synchronously with the movement of the plough mirror 202, mirror wheel 221 or beam saw 231, merely a subgroup of markers can be illuminated. If the subgroup merely includes one marker, and if the subgroup changes to the next marker after a short time, the user gets the visual impression that the marker travels around the measuring surface. By skillfully switching the laser 63 on and off, all local and temporal marking patterns can be represented, which will hereinafter be explained in connection with the embodiment illustrated in FIGS. 25 and 26.

In all embodiments comprising a mirror ring 203, the number of mirror segments 204 defines the maximum number of markers. In one embodiment six of such mirror segments may be provided, eight in another one.

Figure 25:
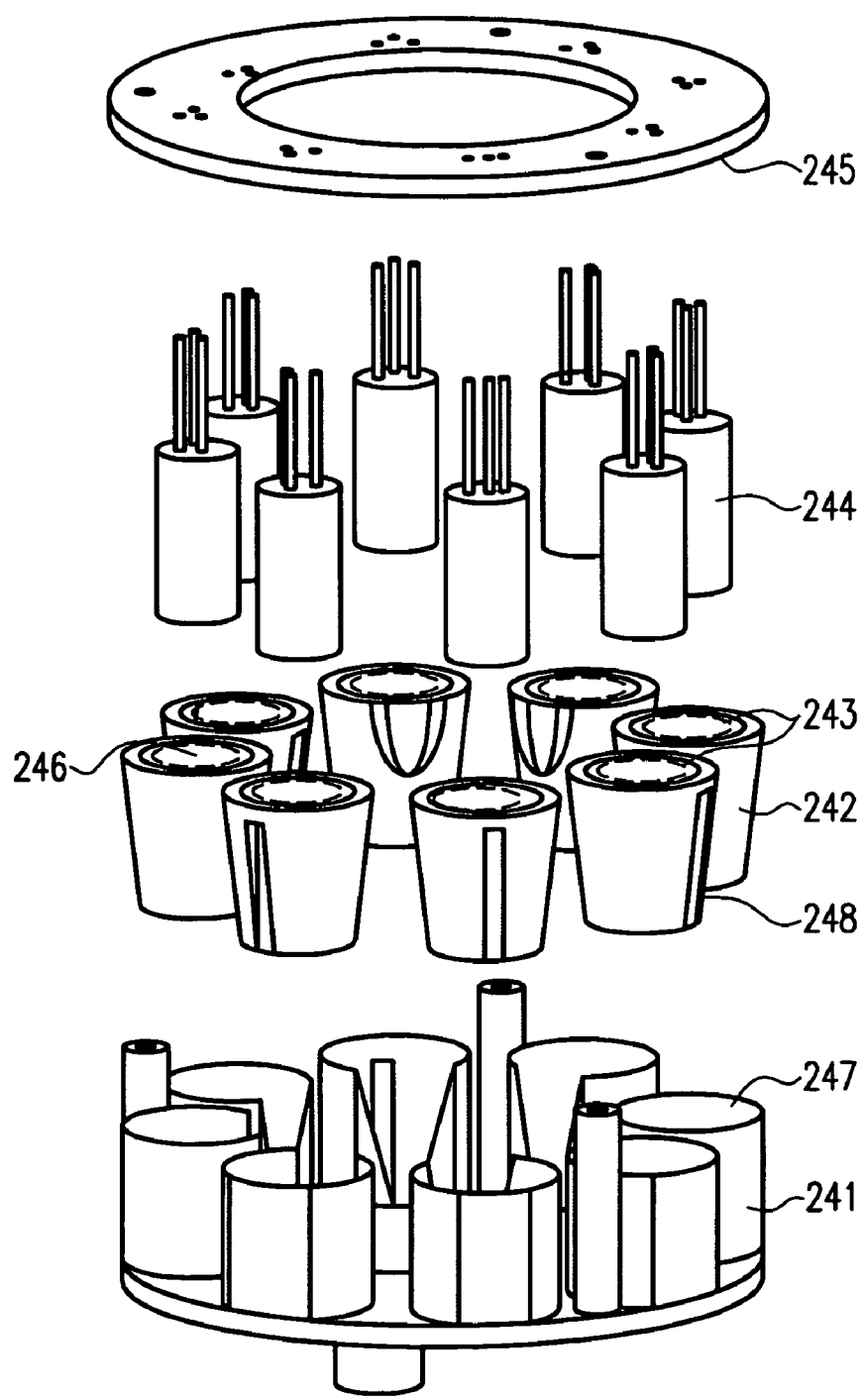
FIG. 25 shows an exploded view of a laser ring.
Figure 26:
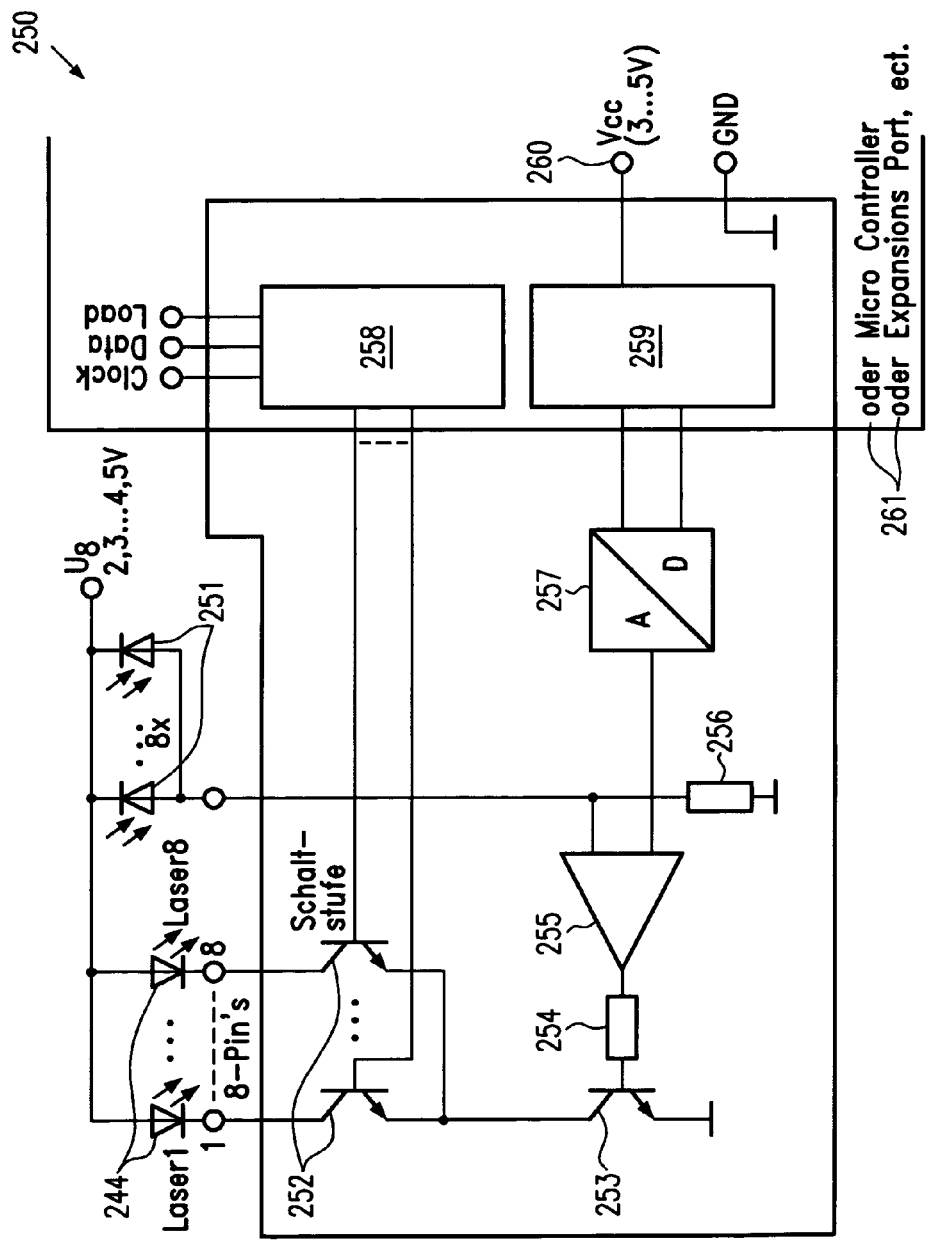
FIG. 26 shows a block diagram of a laser control.

FIG. 25 shows an explosive view of a laser ring for a sighting device for a radiometer. FIG. 26 shows a block diagram of a control circuit for the lasers of the laser ring. According to the embodiment illustrated in FIGS. 25 and 26 a light source, especially a semiconductor laser 244, is provided for each marker.

Particularly inexpensive lasers have the problem that their optical axis is not aligned versus the housing. For this reason, conical individual receptacles 242 are provided. Both the interior and the exterior of said receptacles 242 are conical. Each laser 244 is introduced into a receptacle 242. The optical axis of the laser 244 is then aligned parallel to a mechanical axis of the individual receptacle 242. The mechanical axis may, for instance, be the rotational axis of the individual receptacle 242. For being able to align the connecting wires of lasers 244 versus laser ring 241 in a defined manner later, the individual receptacles 242 may be provided with a groove 248. For this reason, the mechanical axis of an individual receptacle need not necessarily be the symmetrical axis thereof.

After the alignment, the housing of lasers 244 is cast with the individual receptacle 242 by means of a casting compound 243. The casting compound may, for example, be an elastomer or an epoxy resin adhesive.

The laser ring 241, which serves as overall receptacle, has a hollow space 247 for each laser. The interior of each hollow space 247 is likewise conical and has a positive fit with the exterior of the individual receptacles 242. Therefore, if lasers 244 aligned and cast in the individual receptacles are introduced into the hollow spaces 247 of the laser ring 241, the lasers 244 are automatically aligned versus the laser ring 241. Finally, the circuit board 245 is mounted.

The laser ring 241 is, moreover, shaped such that it is automatically aligned, after its assembly into the housing of the radiometer, versus the optical axis of the IR beam path.

FIG. 26 shows a block diagram of a control circuit 250 for lasers 244. The control circuit 244 comprises lasers 244, photodiodes 251, switching transistors 252, power transistors 253, resistor 254, controller 255, resistor 256, D/A converter 257, shift registers 258 and 259 and a power supply connection 260. The two shift registers 258 and 259 may be replaced by a processor 261, especially by a microcontroller or an expansion port.

The control circuit controls, for instance, eight lasers 244 via a microcontroller. The lasers are controlled according to a multiplex method, so that only one laser is switched on at one time. According to another embodiment also two lasers can be switched on simultaneously. In this embodiment, two controllers 255 are provided. The lasers have a power consumption of about 50 mA.

As the laser performance is limited due to safety reasons and has to be adapted for each laser individually, the control is configured such that an individual target value can be adjusted for each laser. The different target values are digitally stored in microcontroller 261. Shift register 259 issues the current target value to the D/A converter 257. The same carries through a digital/analog conversion and issues the analog target value to controller 255. The actual value for the laser control is obtained from photodiodes 251. The photocurrent generates a voltage drop at resistor 256 and is supplied to controller 255 as actual value. A photodiode 251 is comprised in each laser 244. For being able to do with a smallest possible number of pins the photodiodes are connected in parallel.

The selection of the lasers is accomplished via the shift register 258 and the switching transistors 252. The shift register 258 ensures that merely one of the switching transistors 252 is switched to be conductive, so that the switching transistors act as switching elements. The conductive switching transistor connects the corresponding laser with power transistor 253. Said transistor 253 receives the output signal from the controller 255 via the resistor 254.

As an alternative to the control via the shift registers 258 and 259 a parallel bus with a total width of eight bit may be employed. Four bit thereof are intended for the D/A converter, 257.3 bit for the laser selection with a subsequently connected one from eight decoder, and one bit for power down.

The multiplex frequency is in the range of below 1 kHz. The operational voltage $U_8$ for the lasers need not be stabilized, but must be larger than 2.3 V.

The control of the lasers 244 can now be accomplished in that they are successively switched on at a frequency of more than approximately 25 to 30 Hz. As was mentioned above, the multiplexing is, in this case, invisible for the viewer, and the marking of the measuring surface appears as a standing image. If the multiplexing is accomplished at a lower frequency than approximately 20 Hz, the viewer will perceive the same as a running light effect. The frequency may be selected proportionately to the absolute value of the time derivative of the measured temperature, and the direction of rotation may indicate the sign of the temperature change.

Moreover, by illuminating a subgroup of lasers at a frequency of more than 25 Hz, geometric shapes such as a triangle, square, lozenge, hexagon etc. may be displayed. Said images may then be associated with certain measured states. Measured states may, for example, be: Measured temperature is within a temperature range, measured temperature exceeds a limit value or is below the same, or battery alarm.

The lasers may also be divided into two subgroups. The lasers of the first subgroup are, for example, switched off and on so fast that this will be perceived by the viewer as a permanent light. The lasers of the second subgroup are switched off and on so slowly that the viewer will perceive the flashing. By this combination, both the change rate of the measured temperature and the measured states can be visualized to the viewer.

Instead of lasers, other light sources can likewise be employed in the above embodiments. This relates, above all, to LEDs and arc lamps having a corresponding optics.

Above, the invention was explained in more detail by means of preferred embodiments. A person skilled in the art will appreciate, however, that different modifications are possible, without deviating from the spirit of the invention. Therefore, the scope of protection will be defined by the hereinafter following claims and their equivalents.

LIST OF REFERENCE NUMBERS

| | |
|---|---|
| 1 | radiometer including laser sighting device |
| 2 | pyrosensor |
| 3 | IR lens |
| 4 | IR beam path |
| 5 | housing |
| 6 | laser module |
| 7 | lens |
| 8 | prism |
| 9 | holding device |
| 10 | hole |
| 11 | sighting beam path |
| 12 | aperture angle of the sighting beam path |
| 13 | aperture angle of the IR beam path |
| 14 | radius difference |
| 15 | marking |
| 16 | markers |
| 17 | optical axis |
| 18 | lens prism |
| 31 | IR-transparent mirror |
| 32 | glass |
| 41 | mirror with a hole |
| 42 | concave lens |
| 51 | inclined IR lens |
| 52 | metallization |
| 61, 62 | piezo-bending actuator |
| 63 | laser |
| 64, 65 | connecting line |
| 66 | connector |
| 67 | attachment |
| 71, 72 | piezoactuator |
| 73 | bearing |
| 74, 75 | axis |
| 76, 77 | arm |
| 78, 79 | guide mechanism |
| 111 | bearing |
| 112, 113, 114, 115, 119, 120 | wire |
| 116 | edge |
| 117 | leaf spring |
| 118, 123 | piezoactuator |
| 121 | helical spring |
| 122 | center of motion |
| 124 | notch |
| 141, 142 | piezo-bending actuator |
| 143 | prism |
| 161 | measuring surface |
| 171 | flashing |
| 181 | sectorized mirror |
| 182 | concave sectors |
| 183 | inwardly inclined concave sector |
| 190 | point image |
| 191 | central point |
| 201 | piezo-bending actuator |
| 202 | plough mirror |
| 203 | segmented mirror ring |
| 204 | mirror segments |
| 205 | lateral mirror |
| 206 | sighting beams |
| 221 | mirror wheel |
| 222 | driving belt |
| 223 | motor |
| 231 | beam saw |
| 232 | bearing |
| 233 | adjustment bearing |
| 234 | connecting rod |
| 235 | adjusting screw |
| 236 | eccentric |
| 237 | motor |
| 238 | coil |
| 239 | magnet |
| 240 | spring |
| 241 | laser ring |
| 242 | conical receptacles |
| 243 | casting compound |
| 244 | laser |
| 245 | circuit board |
| 246, 247 | hollow space |
| 248 | groove |
| 250 | laser control |
| 251 | photodiodes |
| 252 | switching transistors |
| 253 | power transistor |
| 254 | resistor |
| 255 | controller |
| 256 | resistor |
| 257 | D/A converter |
| 258, 259 | shift registers |
| 260 | supply voltage connection, $V_{cc}$ |
| 261 | processor |

What is claimed is:

1. A sighting device for a radiometer for visibly marking a measuring surface, the temperature of which is measured by said radiometer, comprising:

a light source for emitting a visible light beam marking said measuring surface; and a piezoactuator for controlling a direction of said light beam.

2. The sighting device according to claim 1, wherein said piezoactuator is a piezo-bending actuator.

3. The sighting device according to claim 1, wherein the sighting device further comprises a segmented mirror for dividing the light beam emitted by said light source into a plurality of beams.

4. The sighting device according to claim 3, wherein said segmented mirror comprises central segments and outer segments, wherein said central segments of said segmented mirror are larger than said outer segments.

5. The sighting device according to claim 3, wherein the dividing of the light beam is practiced according to a time-division multiplex method.

6. The sighting device according to claim 1, wherein said light source is a laser; and wherein the sighting device further comprises a first mirror attached to said piezoactuator, wherein the first mirror is adapted to be moved by said piezoactuator and wherein the first mirror deviates the light beam to a segmented mirror, wherein each segment of said segmented mirror reflects said light beam to said measuring surface.

7. The sighting device according to claim 1, wherein the sighting device further comprises an X-actuator and a Y-actuator for controlling said direction of said light beam in two dimensions on said measuring surface.

8. The sighting device according to claim 1, wherein the light source is attached to said actuator.

9. The sighting device according to claim 1, wherein said light source is rotatably suspended and said light source comprises a guide mechanism into which said piezoactuator is rotatably mounted.

10. The sighting device according to claim 1, wherein said light source is rotatably suspended and said light source is connected with said piezoactuator such that said actuator can rotate said light source.

11. The sighting device according to claim 1, wherein said piezoactuator comprises at least one metallized part; said light beam falling upon said metallized part of said piezoactuator wherein said piezoactuator changes said direction of said light beam in response to a voltage applied to said piezoactuator.

12. The sighting device according to claim 11, wherein said at least one metallized part comprises at least one partially metallized part.

13. The sighting device according to claim 1, wherein the sighting device changes said direction of said light beam stepwise so that said light beam marks said measuring surface with points.

14. A sighting device for a radiometer for visibly marking a measuring surface, the temperature of which is measured by said radiometer, comprising:
a light source for emitting a visible light beam marking said measuring surface; and
an actuator for controlling a direction of said light beam; said actuator comprising a coil mounted to a means for varying the direction of said light beam; and a magnet positioned to move said coil in response to a current flow through said coil wherein said means varies the direction of said light beam.

15. The sighting device according to claim 14, wherein the sighting device comprises a segmented mirror for dividing the light beam emitted by said light source into different sighting beams according to a time-division multiplex method.

16. The sighting device according to claim 15, wherein said segmented mirror comprises central segments and outer segments, wherein said central segments of the segmented mirror are larger than said outer segments.

17. The sighting device according to claim 14, wherein said light source is a laser; wherein the means for varying the direction of said light beam comprises a first mirror movable by said actuator to deviate said light beam to a segmented mirror, wherein each segment of said segmented mirror reflects said light beam to said measuring surface.

18. The sighting device according to claim 14, wherein said actuator comprises an X-actuator and a Y-actuator for controlling a position of said light beam in two dimensions on said measuring surface.

19. The sighting device according to claim 14, wherein said light source is attached to said actuator.

20. The sighting device according to claim 14, wherein said light source is rotatably suspended and said light source comprises a guide mechanism into which said actuator is rotatably mounted.

21. The sighting device according to claim 14, wherein the sighting device changes said direction of said light beam stepwise so that said light beam marks said measuring surface with points.

22. The sighting device according to claim 21, wherein said light beam is guided in a circular pattern at a constant angular velocity and that the stepwise change of said direction of said light beam is accomplished by a sectorized mirror comprising three concave sectors.

23. A sighting device for a radiometer for visibly marking a measuring surface, a temperature of which is measured by said radiometer, comprising:
at least three light sources, each of which emits a visible light beam, said light sources being arranged such that said visible light beams generate a plurality of points at an edge of said measuring surface; and
a control circuit for switching said light sources on and off, said control circuit adapted such that at most two light sources are on simultaneously.

24. The sighting device according to claim 23, wherein said sighting device further comprises means for providing said plurality of points in a predefined order at a frequency of up to 20 Hz so that a user has a visual impression that a point travels around said measuring surface; said frequency being in a monotonous relationship with an absolute value of a time derivative of said temperature measured by said radiometer.

25. The sighting device according to claim 23, wherein said plurality of points is illuminated by said each light beam at a frequency of more than 25 Hz so that a human eye perceives the marking as a standing image.

26. The sighting device according to claim 23, wherein the sighting device further comprises means for illuminating at least one of the light sources to indicate a measured state.

27. The sighting device according to claim 26, wherein the means for illuminating at least one of the light sources to indicate a measured state comprises means for illuminating a subgroup of points associated with the measured state.

28. The sighting device according to claim 26, wherein the measured state comprises at least one of a temperature within a temperature range, a temperature exceeding a temperature value, and a temperature less than a temperature value.

29. The sighting device according to claim 23, wherein the sighting device further comprises means for providing a first subgroup of said plurality of points in a predefined order at a frequency of up to 20 Hz and means for providing a second subgroup of said plurality of points at a frequency of up to 25 Hz; said first and second subgroup displaying measured states.

30. The sighting device according to claim 23, wherein said control circuit comprises a switching circuit including a switching element for each light source; each light source being connected to a switching element and all switching elements being connected to a controller, wherein said controller controls the brightness of said light source connected therewith.

31. The sighting device according to claim 30, wherein said control circuit further comprises a digital/analog converter and a processor; said processor being connected to said switching circuit for controlling said switching circuit and for switching on one of said light sources; said processor being connected to said digital/analog converter and supplying a digital target value to said digital/analog converter; said digital/analog converter converting said digital target value into an analog target value supplied by said digital/analog converter to said controller, wherein said controller is supplied with an actual value from a photodiode; said photodiode measuring said brightness of one of said light sources; and said controller supplying an output signal to said one of said light sources via said switching circuit.

32. The sighting device according to claim 23, wherein the sighting device further comprises means for illuminating at least one of the light sources to indicate a battery alarm.

33. A sighting device for a radiometer for visibly marking a measuring surface, the temperature of which is measured by said radiometer, the sighting device comprising:
a light source for emitting a visible light beam; and
a sectorized mirror upon which said light beam falls, said sectorized mirror causing a stepwise change of direction of said light beam wherein a plurality of reflected light beams marks said measuring surface.

34. The sighting device according to claim 33, wherein said sectorized mirror comprises at least three concave sectors.

35. The sighting device according to claim 33, wherein said sighting device further comprises means for guiding said light beam at a constant angular velocity.

36. A sighting device for a radiometer for visibly marking a measuring surface, said temperature of which is measured by said radiometer, comprising:
a light source mounted in a housing;
an individual receptacle having a hollow space being larger than the outer dimensions of a housing of said light source and receiving said housing of said light source; and
a fixation fixing said housing of said light source in said hollow space; said fixation being formed such that an optical axis of said light source extends parallel to a mechanical axis of said individual receptacle.

37. The sighting device according to claim 36, wherein the outer shape of each individual receptacle is conical.

38. The sighting device according to claim 36, wherein the sighting device further comprises an overall receptacle having a hollow space for each individual receptacle, wherein an inner surface area of each hollow space of said overall receptacle has a positive fit with an outer shape of said individual receptacle when said individual receptacle is positioned into said hollow space.

39. A sighting device for a radiometer for visibly marking a measuring surface, a temperature of which is measured by said radiometer, comprising:
a plurality of light sources emitting visible light for marking the measuring surface; and
a plurality of individual receptacles; one individual receptacle being provided for fixedly receiving each light source, wherein an optical axis of each light source is aligned parallel to a mechanical axis of said corresponding individual receptacle.

40. The sighting device according to claim 39, wherein an outer shape of each individual receptacle is conical.

41. The sighting device according to claim 39, wherein the sighting device further comprises an overall receptacle; said overall receptacle having a hollow space for each individual receptacle, wherein an inner surface area of each hollow space of said overall receptacle has a positive fit with an outer shape of said individual receptacle when said individual receptacle is positioned into said hollow space.

42. A radiometer, comprising:
an IR detector;
a lens being arranged with respect to said IR detector such that the lens focuses IR radiation from a measuring surface to said detector; and
a light source emitting visible light for marking said measuring surface; said marking providing a visible indication based upon a reading of said IR detector.

43. The radiometer according to claim 42, wherein an optical axis is defined by said IR detector and said lens, and wherein a beam path of said visible light emitted by said light source extends towards said optical axis, said radiometer further comprising a deviating means in the proximity of said optical axis, said deviating means adapted to deviate said beam path of said visible light.

44. The radiometer according to claim 43, wherein said deviating means comprises a means for deflecting light beams encountering said deviating means at different locations about different angles.

45. The radiometer according to claim 43, wherein said deviating means comprises a prism.

46. The radiometer according to claim 43, wherein said deviating means is formed by a mirror.

47. The radiometer according to claim 43, wherein said deviating means comprises a hole about said optical axis through which said IR radiation can fall upon said detector.

48. The radiometer according to claim 43, wherein a second lens for visible light is arranged between said light source and said deviating means.

49. The radiometer according to claim 42, wherein said lens comprises a bore where said visible light passes said lens.

50. The radiometer according to claim 42, wherein a beam path of the visible light for marking said measuring surface extends through said lens.

51. The radiometer according to claim 42, wherein the visible indication comprises a visible rotational indication based upon the reading of said IR detector.

52. The radiometer according to claim 51, wherein the visible rotational indication comprises one of a clockwise and a counter-clockwise visible rotational indication.

53. The radiometer according to claim 42, wherein the visible indication comprises a visible frequency indication based upon the reading of said IR detector.

54. The radiometer according to claim 53, wherein the visible frequency indication comprises a change in rotational frequency of the marking.

55. The radiometer according to claim 42, wherein the visible indication comprises one of flashing and flickering.

56. The radiometer according to claim 42, wherein the visible indication comprises a dynamic visible indication.

57. A radiometer comprising:
an IR detector;
a light source emitting visible light for marking a measuring surface; and
a lens arranged with respect to said IR detector, wherein said IR detector and said lens define an optical axis and wherein the lens focuses IR radiation from the measuring surface to said detector;
said lens being inclined versus said optical axis so that a first reflected portion of said IR radiation encountering an outer side of said lens is smaller than a second reflected portion of the light of said light source encountering said outer side of said lens.

58. A method for a radiometer of visibly marking a measuring surface, comprising:
emitting a visible light beam by a light source for marking said measuring surface; and
controlling a direction of said light beam by means of a piezoactuator.

59. A method for a radiometer of visibly marking a measuring surface, comprising:
emitting a visible light beam by a light source for marking said measuring surface; and
controlling said direction of said light beam by means of an actuator, wherein said actuator comprises a coil mounted to a means for varying the direction of said light beam; and a magnet positioned to move said coil in response to a current flow through said coil wherein said means varies the direction of said light beam.

60. A method for a radiometer of visibly marking a measuring surface, the method comprising:
emitting visible light beams by at least three light sources for marking said measuring surface, each light source emitting one light beam; and
switching said light sources on and off, at most two light sources being switched on simultaneously.

61. A method for a radiometer of visibly marking a measuring surface, the method comprising:
emitting a visible light beam by a light source for marking said measuring surface;
guiding said light beam in a circular pattern at a constant angular velocity; and
changing a direction of said light beam stepwise by a sectorized mirror.

62. A method for a radiometer for adjusting a light source for visibly marking a measuring surface, the method comprising
introducing a housing of a light source into an individual receptacle;
aligning an optical axis of said light source parallel to a mechanical axis of said individual receptacle; and
fixing said housing of said light source within said individual receptacle.

63. A method for a radiometer for adjusting a light source for visibly marking a measuring surface of said radiometer, the method comprising:
introducing each light source of a plurality of light sources outputting visible light to mark said measuring surface into an individual receptacle;
aligning an optical axis of each said light sources parallel to a mechanical axis of said corresponding individual receptacle
assembling said light sources together with said receptacles into a sighting device.

64. A method for a radiometer comprising:
focusing IR radiation emitted by a measuring surface by means of a lens on an IR detector;
determining a temperature of said measuring surface on the basis of a signal supplied by said IR detector;
marking said measuring surface by visible light; and
indicating with said marking at least one of a measured state and a change of temperature based upon said determined temperature.

65. The method according to claim 64, wherein marking said measuring surface by visible light comprises guiding said visible light through said lens.

66. The method according to claim 64, wherein indicating with said marking comprises varying said marking.

67. The method according to claim 66, wherein varying said marking comprises varying one of a rotational frequency, a rotational direction, and illumination of said marking.

68. The method according to claim 64, wherein indicating with said marking comprises dynamically indicating with said marking.

69. A method for a radiometer comprising:
focusing IR radiation emitted by a measuring surface by means of a lens on an IR detector, said lens being inclined versus an optical axis;
determining a temperature of said measuring surface on the basis of a signal supplied by said IR detector;
emitting visible light onto an outer surface of said lens and reflecting at least some of said visible light from said outer surface upon the measuring surface; and
marking said measuring surface with said visible light reflected by said outer surface of said lens.

70. The method according to claim 69, wherein reflecting at least some of the visible light from said outer surface upon the measuring surface is practiced whereby a reflected portion of said IR radiation encountering an outer side of said lens is smaller than said reflected portion of said visible light of said light source encountering said outer side of said lens.

\* \* \* \* \*